United States Patent
Chirakkil et al.

(10) Patent No.: US 11,972,278 B2
(45) Date of Patent: Apr. 30, 2024

(54) DYNAMIC COMPUTING TOUCHPOINT JOURNEY RECOMMENDATION PLATFORM

(71) Applicant: PayPal, Inc., San Jose, CA (US)

(72) Inventors: Vinesh Chirakkil, San Jose, CA (US);
Pankaj Sarin, Fremont, CA (US);
Thomas Doran, Palo Alto, CA (US);
Matthew Fundus, Lincoln, NE (US)

(73) Assignee: PayPal, Inc., San Jose, CA (US)

( * ) Notice: Subject to any disclaimer, the term of this patent is extended or adjusted under 35 U.S.C. 154(b) by 555 days.

(21) Appl. No.: 16/880,568

(22) Filed: May 21, 2020

(65) Prior Publication Data

US 2021/0365279 A1 Nov. 25, 2021

(51) Int. Cl.
| | |
|---|---|
| *G06F 9/451* | (2018.01) |
| *G06F 3/04883* | (2022.01) |
| *G06F 11/34* | (2006.01) |
| *G06F 17/18* | (2006.01) |
| *G06N 3/08* | (2023.01) |
| *G06N 5/04* | (2023.01) |

(Continued)

(52) U.S. Cl.
CPC .......... *G06F 9/453* (2018.02); *G06F 3/04883* (2013.01); *G06F 11/3438* (2013.01); *G06F 17/18* (2013.01); *G06N 3/08* (2013.01); *G06N 5/04* (2013.01); *G06N 7/01* (2023.01); *G06N 20/00* (2019.01)

(58) Field of Classification Search
CPC ...... G06F 9/453; G06F 3/04883; G06F 17/18; G06N 20/00
See application file for complete search history.

(56) References Cited

U.S. PATENT DOCUMENTS 10,044,817 B2 * 8/2018 Vuyyuru .................. H04W 4/50
11,113,274 B1 * 9/2021 Thiel ....................... G06F 16/242
(Continued)

*Primary Examiner* — David E Choi
(74) *Attorney, Agent, or Firm* — Greenberg Traurig, LLP

(57) ABSTRACT

Systems and techniques that facilitate computing touchpoint journey recommendations are provided. In various embodiments, an input component can receive a computing context of a client and a computing profile of a client. In various instances, the client can be engaged in a computing touchpoint journey. In various embodiments, a prediction component can predict, via a first machine learning classifier, a negative event likely to occur on the computing touchpoint journey. In various cases, the first machine learning classifier can receive as input the computing context and the computing profile and can generate as output the predicted negative event. In various embodiments, a decision component can recommend in real-time, via a second machine learning classifier, a computing touchpoint to which to transfer the client. In various aspects, the second machine learning classifier can receive as input the computing context, the computing profile, and the predicted negative event and produce as output the recommended computing touchpoint. In various embodiments, an execution component can transfer the client to the recommended computing touchpoint. In various embodiments, a computing touchpoint journey component can record computing touchpoint journeys traversed by various clients and trains the first and second machine learning classifiers on the recorded computing touchpoint journeys.

23 Claims, 15 Drawing Sheets

(51) Int. Cl.
*G06N 7/01* (2023.01)
*G06N 20/00* (2019.01)

(56) References Cited

U.S. PATENT DOCUMENTS

| | | | |
|---|---|---|---|
| 11,392,484 B2* | 7/2022 | Myers | G06N 3/08 |
| 2014/0207622 A1* | 7/2014 | Vijayaraghavan | G06Q 30/0201 |
| | | | 705/26.62 |
| 2017/0140387 A1* | 5/2017 | Nandi | G06Q 30/016 |
| 2020/0126126 A1* | 4/2020 | Briancon | G06N 5/01 |
| 2020/0272283 A1* | 8/2020 | Sarin | G06N 20/10 |
| 2020/0293621 A1* | 9/2020 | Ayers | G06F 40/40 |
| 2021/0049481 A1* | 2/2021 | Robinson | G06N 5/022 |
| 2021/0174404 A1* | 6/2021 | Pitti | H04W 64/006 |
| 2021/0209525 A1* | 7/2021 | Oppelstrup | G06Q 10/02 |
| 2021/0232934 A1* | 7/2021 | Lai | G06N 3/126 |
| 2021/0278953 A1* | 9/2021 | Jang | G06F 9/451 |
| 2021/0295381 A1* | 9/2021 | Wackerbauer | G06Q 30/0252 |
| 2021/0365279 A1* | 11/2021 | Chirakkil | G06F 11/302 |
| 2022/0036449 A1* | 2/2022 | Barakat | G06Q 40/00 |

* cited by examiner

DYNAMIC COMPUTING TOUCHPOINT JOURNEY RECOMMENDATION PLATFORM

TECHNICAL FIELD

The subject disclosure relates generally to computing touchpoint journeys, and more specifically to dynamic computing touchpoint journey recommendation platforms.

BACKGROUND

Conventionally, computing touchpoint journeys are relatively deterministic and are analyzed in an offline fashion. That is, computing clients engage in computing touchpoint journeys by interacting with a set of computing touchpoints, the computing touchpoint journeys are recorded and examined to identify problems and/or inefficiencies, and the computing touchpoints are subsequently redesigned, rebuilt, and/or reprogrammed to address the identified problems and/or inefficiencies. Computing clients then engage in new computing touchpoint journeys by interacting with the set of redesigned, rebuilt, and/or reprogrammed computing touchpoints, the new computing touchpoint journeys are recorded and examined to identify new and/or remaining problems and/or inefficiencies, and the computing touchpoints are again redesigned, rebuilt, and/or reprogrammed. This process is time-consuming and often requires many cycles and/or iterations of redesigning, rebuilding, and/or reprogramming the computing touchpoints before acceptable and/or optimal computing touchpoint journeys are achieved.

Systems and/or techniques that can ameliorate one or more of these issues are desirable.

DETAILED DESCRIPTION

Figure 1:
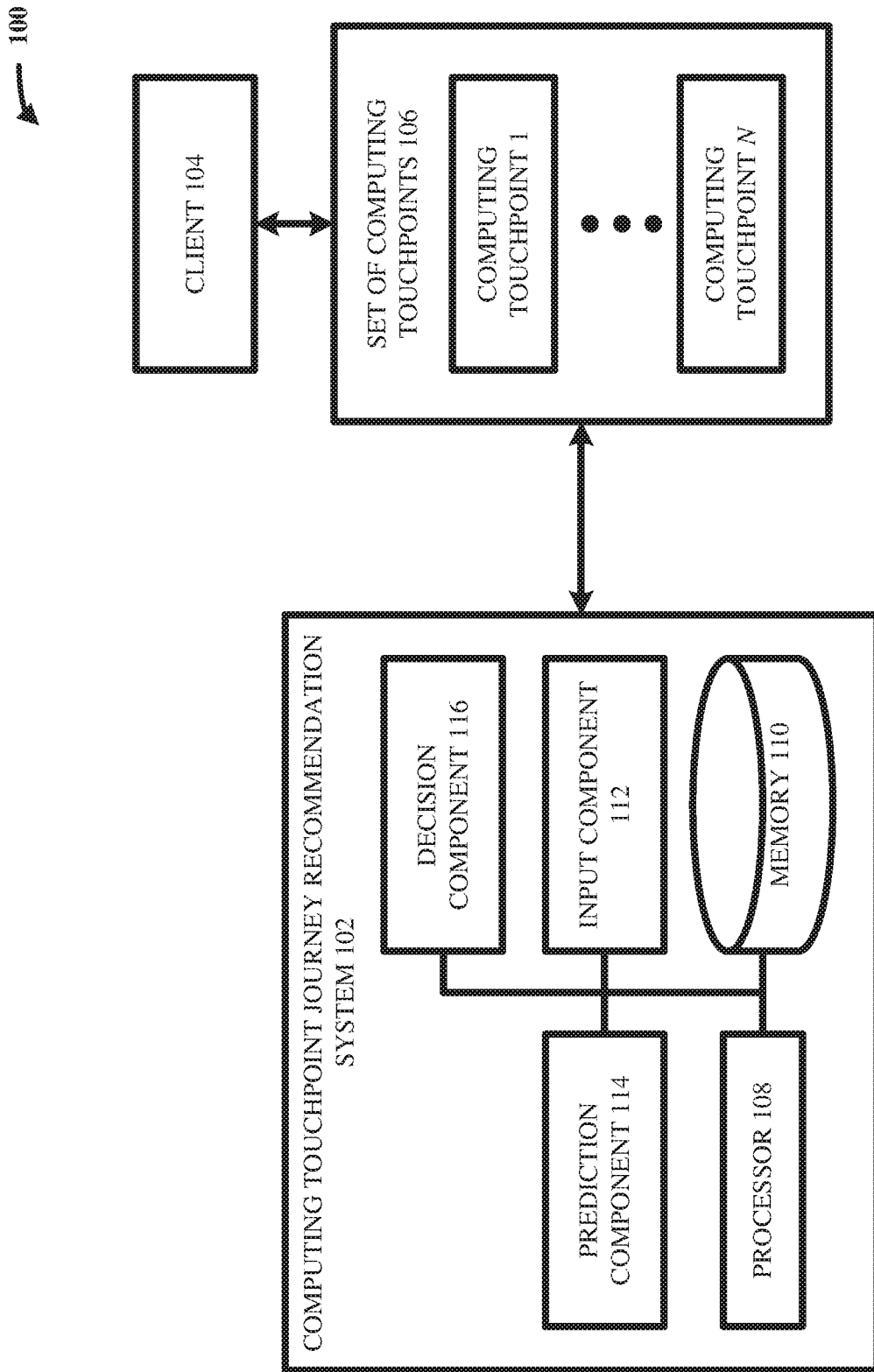
FIG. 1 illustrates a high-level block diagram of an example, non-limiting system that facilitates dynamic computing touchpoint journey recommendations in accordance with one or more embodiments described herein.

The following detailed description is merely illustrative and is not intended to limit embodiments and/or application or uses of embodiments. Furthermore, there is no intention to be bound by any expressed or implied information presented in the preceding Background section, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A modern computerized transaction system can involve a computing client that interacts with a set of computing touchpoints. In various instances, the computing client can have an objective to be fulfilled by the computerized transaction system, and that objective can, in some cases, be furthered, fulfilled, handled, and/or resolved by interacting with one or more of the set of computing touchpoints. In various aspects, a computing touchpoint can be a computerized service, a computerized program, a computerized application, and/or any other suitable combination of computer hardware and/or software that possesses executable functionality and with which a computing client can remotely, electronically, and/or digitally interact (e.g., a website, a computerized tool on a website, a mobile application, a computerized tool on a mobile application, a chatbot, an interactive voice response program, an automated email program, an automated survey program). In various other aspects, a computing touchpoint can be any suitable channel of electronic and/or digital communication by which the computing client can interact with an operator, technician, and/or customer service representative (e.g., an audio connection such as through a telephone, a video connection such as through screen sharing or Internet chatting, an audio-video connection such as through video conferencing).

In various aspects, the computing client can engage in a computing touchpoint journey through the set of computing touchpoints in order to fulfill an objective. That is, in various aspects, the computing client can sequentially (and/or in parallel, in some cases) traverse the set of computing touchpoints and/or a subset of the computing touchpoints to accomplish and/or attempt to accomplish the objective. For instance, suppose that a computerized transaction system includes computing touchpoint A, computing touchpoint B, computing touchpoint C, and computing touchpoint D (e.g., the computerized transaction system includes four available computing touchpoints). In various cases, a computing touchpoint journey through such a computerized transaction system can include first interacting with computing touchpoint A and finally interacting with computing touchpoint B (e.g., a two-touchpoint journey from A to B). Another computing touchpoint journey through such a computerized transaction system can include first interacting with computing touchpoint C, next interacting with computing touchpoint A, and finally interact with computing touchpoint D (e.g., a three-touchpoint journey from C to A to D). Yet another computing touchpoint journey through such a computerized transaction system can include first interacting with computing touchpoint D, next interacting with computing touchpoint C, next interacting with computing touchpoint A, and finally interacting with computing touchpoint B (e.g., a four-touchpoint journey from D to C to A to B). In various aspects, a computing touchpoint journey can include sequentially interacting with any suitable combination and/or permutation of any suitable set and/or subset of available computing touchpoints in a computerized transaction system.

In various aspects, it can be beneficial to analyze computing touchpoint journeys of computing clients in order to identify problems and/or inefficiencies (e.g., pain points) in the computing touchpoints and/or in the computerized transaction system. Conventionally, computing touchpoint journeys are explicitly programmed and are thus relatively deterministic. In other words, a computing client at a given computing touchpoint is presented with the same options for a next computing touchpoint, regardless of any preferences and/or idiosyncrasies of the computing client. Moreover, computing touchpoint journeys are conventionally analyzed in an entirely offline fashion. That is, computing clients engage in computing touchpoint journeys by interacting with a set of computing touchpoints, the computing touchpoint journeys are recorded and examined to identify problems and/or inefficiencies, and the computing touchpoints are subsequently redesigned, rebuilt, and/or reprogrammed to address the identified problems and/or inefficiencies. Computing clients then engage in new computing touchpoint journeys by interacting with the set of redesigned, rebuilt, and/or reprogrammed computing touchpoints, the new computing touchpoint journeys are recorded and examined to identify new and/or remaining problems and/or inefficiencies, and the computing touchpoints are again redesigned, rebuilt, and/or reprogrammed. This process is time-consuming, often requires many cycles and/or iterations of redesigning, rebuilding, and/or reprogramming the computing touchpoints before acceptable and/or optimal computing touchpoint journeys are achieved, and is reactive rather than proactive.

Various embodiments of the subject innovation can address one or more of these issues/problems by facilitating dynamic computing touchpoint journey recommendations. One or more embodiments described herein include systems, computer-implemented methods, apparatus, and/or computer program products that can facilitate dynamic computing touchpoint journey recommendations in a computerized transaction system. In various instances, dynamic computing touchpoint journey recommendations can include dynamically recommending, suggesting, and/or proposing a next computing touchpoint for a computing client currently engaged in a computing touchpoint journey, wherein the recommended next computing touchpoint can be based on context information and/or profile information relating to the computing client.

In various aspects, context information can include the objective of the computing client, the current computing touchpoint with which the computing client is currently interacting in the computing touchpoint journey, one or more previous computing touchpoints with which the computing client previously interacted during the computing touchpoint journey, a device modality of the computing client, and/or any other suitable information that characterizes a state and/or aspect of the computing touchpoint journey of the computing client. In various instances, profile information can include demographic information of the computing client, computing touchpoint preferences of the computing client, payment information of the computing client, and/or any other suitable information that characterizes the computing client. In other words, the context information can, in some cases, be considered as data that characterize a current computing touchpoint journey of the computing client (e.g., data indicating where the computing touchpoint journey has already taken the computing client, where the computing client currently is in the computing touchpoint journey, and/or the ultimate goal and/or objective that the computing client desires to fulfill). Similarly, the profile information can, in some cases, be considered as data that characterize the computing client itself (e.g., age, ethnicity, geographic location, preferences/settings, and/or financial instrument information of the computing client).

Since different computing clients can have different profile information, embodiments of the subject innovation can recommend different next computing touchpoints for different computing clients, even if the different computing clients have the same and/or similar context information. In this way, computing touchpoint journeys can, in some instances, be tailored to each individual computing client.

In various aspects, embodiments of the subject innovation can provide a proactive computing touchpoint journey recommendation paradigm. In various instances, embodiments of the subject innovation can predict a negative event that is likely to occur on a computing touchpoint journey of a computing client and can recommend one or more suitable next computing touchpoints to which to direct the computing client, so as to handle the negative event before it occurs.

In various aspects, embodiments of the subject innovation can be implemented as a computing touchpoint journey recommendation system. In various aspects, the computing touchpoint journey recommendation system can comprise an input component, a prediction component, and a decision component.

In various instances, the input component can receive, retrieve, fetch, and/or otherwise obtain context data and profile data associated with a computing client currently engaged in a computing touchpoint journey. As mentioned above, the context data can include data that characterize the computing touchpoint journey (e.g., current computing touchpoint, one or more previous computing touchpoints, objective/purpose of the computing touchpoint journey, device modality used by the computing client to engage in the computing touchpoint journey) and the profile data can include data that characterize the computing client (e.g., demographics, preferences, financial instrument information). In various aspects, the context data and/or profile data can be generated, collected, aggregated, maintained, and/or recorded via any suitable technique. For instance, in some cases, the context data can be recorded and updated in real-time by the computing touchpoints with which the computing client interacts as the computing touchpoint journey progresses (e.g., a current computing touchpoint can receive the context data from the previous computing touchpoint, can update the context data to show when and/or how the current computing touchpoint was visited by the computing client, and can push the updated context data to a next computing touchpoint). In some cases, the profile data can be inputted by the computing client at the start of the computing touchpoint journey and/or at any other point and/or points along the computing touchpoint journey. In some cases, the profile data associated with the computing client can be already stored in any suitable database and/or any suitable electronic/digital application and can thus be retrieved by the computing touchpoint journey recommendation system. In various aspects, the current computing touchpoint with which the computing client is currently interacting can push the context data and/or the profile data to the computing touchpoint journey recommendation system.

In various instances, the prediction component can predict a negative event likely to occur on the computing touchpoint journey, based on the context data and the profile data. In various aspects, the prediction component can employ a first machine learning classifier (e.g., artificial neural network, naïve Bayes, decision tree, k-nearest neighbor, logistic regression). In various embodiments, the first machine learning classifier can be trained to receive as input the context data and the profile data and to produce as output the predicted negative event. In some cases, the first machine learning classifier can be trained via any suitable artificial intelligence training paradigm (e.g., supervised learning on labeled datasets, unsupervised learning on unlabeled datasets, reinforcement learning). In some cases, the first machine learning classifier can be considered a black box classifier function that is defined by its inputs (e.g., context data and profile data) and outputs (e.g., predicted negative event). In various aspects, the predicted negative event can be any suitable occurrence relevant to the computing touchpoint journey and that is undesirable and/or otherwise contrary to the objective of the computing client (e.g., if the computing client is engaging on the computing touchpoint journey to purchase a product from the internet, a predicted negative event can be a payment decline and/or an out-of-stock indication).

In various instances, the decision component can recommend a next computing touchpoint to which to direct the computing client, based on the context data, the profile data, and the predicted negative event. In various aspects, the decision component can employ a second machine learning classifier (e.g., artificial neural network, naïve Bayes, decision tree, k-nearest neighbor, logistic regression). In various embodiments, the second machine learning classifier can be trained to receive as input the context data, the profile data, and the predicted negative event and to produce as output the recommended next computing touchpoint. In some cases, the second machine learning classifier can be trained via any suitable artificial intelligence training paradigm (e.g., supervised learning on labeled datasets, unsupervised learning on unlabeled datasets, reinforcement learning). In some cases, the second machine learning classifier can be considered a black box classifier function that is defined by its inputs (e.g., context data, profile data, predicted negative event) and outputs (e.g., recommended next computing touchpoint). In various aspects, the recommended next computing touchpoint can be any suitable computing touchpoint, from any suitable set and/or subset of available computing touchpoints, that is calculated, determined, and/or inferred to successfully handle and/or resolve the predicted negative event for the particular computing client. Since the profile data can be an input that is received by the second machine learning classifier, the recommended next computing touchpoint can be based on touchpoint preferences and/or demographics of the computing client (e.g., tailored to the computing client). For example, suppose that two different computing clients engage in same and/or similar computing touchpoint journeys, where the first computing client is elderly and prefers in-person and vocal customer service, and where the second computing client is young and satisfied with automated customer service. Suppose that the first machine learning classifier predicts a payment decline for each computing client. In various instances, the second machine learning classifier can recommend a telephone call with a customer service representative as the next computing touchpoint for the first computing client (e.g., since the preferences of the first computing client cut against automated customer service such as chatbots and/or interactive voice response, cut against in-person textual customer service such as internet chatting, and cut in favor of in-person telephone calls). In various instances, the second machine learning classifier can recommend a chatbot as the next computing touchpoint for the second computing client (e.g., since the preferences of the second computing client do not cut against automated customer service such as chatbots). As another example, suppose that the second computing client is satisfied with automated customer service but still prefers vocal, rather than textual, customer service. In such case, the second machine learning classifier can recommend an interactive voice response as the next computing touchpoint for the second computing client (e.g., since the preferences of the second computing client cut against automated textual customer service such as chatbots and cut in favor of automated vocal customer service such as interactive voice response).

In this way, embodiments of the subject innovation can leverage machine learning models to predict a negative event that can occur along the computing touchpoint journey of a computing client and to recommend a next computing touchpoint that has a sufficiently high likelihood (e.g., above a predetermined threshold) of successfully handling and/or resolving the predicted negative event. Such computing touchpoint recommendations can provide a dynamic computing touchpoint journey experience for a computing client that is specifically tailored to the preferences and/or demographics of the computing client. In other words, embodiments of the subject innovation can recommend in real-time how a computing touchpoint journey for a given computing client should proceed, based at least in part on idiosyncratic information pertaining to the computing client (e.g., a potential negative occurrence can be predicted, and a suitable computing touchpoint can be recommended to handle the potential negative occurrence before it occurs).

In various aspects, embodiments of the subject innovation can comprise a computing touchpoint journey component. In various instances, the computing touchpoint journey component can log, record, aggregate, and/or otherwise document computing touchpoint journeys of various computing clients that interact with a given computerized transaction system. In various cases, the computing touchpoint journey component can be any suitable database, data structure, and/or data warehouse that can log, record, aggregate, and/or otherwise document any suitable number of computing touchpoint journeys. In various aspects, the computing touchpoint journey component can facilitate training of the first and/or second machine learning classifiers on the logged, recorded, aggregated, and/or otherwise documented computing touchpoint journeys. For instance, in various aspects, each logged, recorded, aggregated, and/or otherwise documented computing touchpoint journey can include context data and profile data associated with a corresponding computing client, can include one or more negative events that occurred during the computing touchpoint journey, can include one or more flagged and/or labeled computing touchpoints that ultimately resulted in unsuccessful handling and/or resolution of the one or more negative events, and/or can include one or more flagged and/or labeled computing touchpoints that ultimately resulted in successful handling and/or resolution of the one or more negative events. In various instances, the flag and/or label associated with various computing touchpoints can be provided by an operator and/or by a computing client (e.g., via post-issue resolution surveys and/or emails). Thus, in various aspects, the first machine learning classifier can be trained to determine and/or infer negative events based on profile data and context data (e.g., can be trained through backpropagation to correlate particular context data and particular profile data with particular negative events). Similarly, in various aspects, the second machine learning classifier can be trained to determine and/or infer recommended computing touchpoints based on profile data, context data, and predicted negative events (e.g., can be trained through backpropagation to correlate particular context data, particular profile data, and particular negative events with particular computing touchpoints that led to successful resolution). In some instances, the computing touchpoint journey component can facilitate offline (e.g., batch) training of the first and/or second machine learning classifiers. In some instances, the computing touchpoint journey component can facilitate online (e.g., real-time) training of the first and/or second machine learning classifiers as the computing touchpoint journeys are logged, recorded, aggregated, and/or otherwise documented.

In this way, embodiments of the subject innovation can actively learn and/or be updated in real-time to provide improved recommendations without requiring the computing touchpoints to undergo repetitive iterations of redesigning, rebuilding, and/or reprogramming (e.g., the first and/or second machine learning classifiers can be actively trained via backpropagation in real-time based on logged computing touchpoint journeys, such that the actively trained/updated first and/or second machine learning classifiers can make improved recommendations; in various cases, no iterative reprogramming of the computing touchpoints themselves can be required).

Consider the following example. Suppose that a computing client desires to make a purchase. A computerized transaction system that facilitates purchases can include a catalog webpage, a specific product webpage, a payment webpage, a frequently-asked-questions webpage, a chatbot, an interactive voice response, an internet chat with a customer service representative, and a phone line to a customer service representative. In various aspects, these can be considered as eight computing touchpoints of the computerized transaction system.

In conventional systems/techniques, computing touchpoint journeys are relatively deterministic and reactive. Under such conventional systems/techniques, the computing client can first visit the catalog webpage so as to browse and/or select a product to purchase (e.g., the catalog webpage can provide interactive links and/or descriptions of various products available for purchase). The computing client can be transferred from the catalog webpage to the specific product webpage by selecting an interactive link on the catalog webpage that corresponds to the specific product. The computing client can select a purchase link on the specific product webpage, which can direct and/or transfer the computing client to the payment webpage, so as to input payment information relating to the computing client (e.g., identification information, financial instrument information). In various aspects, the payment webpage can perform a computerized check and/or verification of the payment information regarding the computing client. Suppose that the computing client experiences a payment decline at the payment webpage (e.g., insufficient funds to purchase the specific product). In such case, the computing client can be directed to the frequently-asked-questions webpage (e.g., the frequently-asked-questions webpage can provide general information regarding how to proceed when a payment decline and/or other issue is encountered and/or can provide interactive links and/or instructions for accessing the other computing touchpoints). In various aspects, the computing client can find the frequently-asked-questions webpage insufficiently helpful and can thus elect to interact with a different computing touchpoint (e.g., the computing client can select an interactive link and/or follow instructions provided on the frequently-asked-questions webpage). As this example exemplifies, conventional systems/techniques merely provide generic and uniform instructions to every computing client (e.g., automatically sending every computing client to the frequently-asked-questions webpage, automatically providing a chatbot to every computing client) and otherwise leave the computing client to aimlessly wander through the computing touchpoints on their own.

In stark contrast, embodiments of the subject innovation can provide dynamic, tailored recommendations as to which computing touchpoint the computing client should visit next, based on the computing client's own preferences and/or demographics. To continue the above the example, various embodiments of the subject innovation can predict (e.g., via the first machine learning classifier) that the computing client will experience a payment decline before the payment decline occurs. For instance, the computing client can be transferred to the specific product webpage from the catalog webpage. Accordingly, the specific product webpage can push the profile data and the context data associated with the computing client to the computing touchpoint journey recommendation system. In various cases, the context data can indicate that the computing client first visited the catalog webpage and that the computing client next visited the specific product webpage. Based on this information, the first machine learning classifier can, in some cases, infer and/or determine that the computing client wishes to purchase the specific product.

Moreover, in various aspects, the profile data can indicate that the computing client is associated with a financial instrument that has a particular level of available funds. In various aspects, the particular level of available funds can be less than the price of the specific product. Based on this information, the first machine learning classifier can predict at the specific product webpage that the computing client is likely to experience a payment decline. Accordingly, in various instances, the second machine learning classifier can recommend a computing touchpoint to which to direct and/or transfer the computing client based on the context data, the profile data, and the predicted payment decline. Suppose that the profile data indicate that the computing client prefers textual customer service. In such case, the second machine learning classifier can recommend a chatbot as the next computing touchpoint (e.g., the chatbot can textually prompt the computing client for information that would rectify/avoid the payment decline and/or can otherwise make suggestions to the computing client for overcoming/avoiding the payment decline).

As another example, suppose that the profile data indicate that the computing client prefers aural/verbal customer service. In such case, the second machine learning classifier can recommend an interactive voice response as the next computing touchpoint (e.g., the interactive voice response can verbally prompt the computing client for information that would rectify/avoid the payment decline and/or otherwise make suggestions to the computing client for overcoming/avoiding the payment decline). As yet another example, suppose that the profile data indicate that the computing client prefers in-person textual customer service. In such case, the second machine learning classifier can recommend an Internet chat with a customer service representative as the next computing touchpoint (e.g., the customer service representative can textually prompt the computing client for information that would rectify/avoid the payment decline and/or otherwise make suggestions to the computing client for overcoming/avoiding the payment decline).

As still another example, suppose that the profile data indicate that the computing client prefers in-person aural/verbal customer service. In such case, the second machine learning classifier can recommend a telephone call with a customer service representative as the next computing touchpoint (e.g., the customer service representative can verbally prompt the computing client for information that would rectify/avoid the payment decline and/or otherwise make suggestions to the computing client for overcoming/avoiding the payment decline). As shown, embodiments of the subject innovation can dynamically provide real-time recommendations as to next computing touchpoints for a computing client, where the recommendations are tailored to the computing client.

In various embodiments, the profile data can include tiered and/or ranked preferences of the computing client. In such cases, the second machine learning classifier can recommend a next computing touchpoint based on the ranked preferences in view of likelihood-of-success considerations and/or load-balancing considerations.

In some cases, embodiments of the subject innovation can recommend as a next computing touchpoint only those computing touchpoints that have additional load capacity (e.g., that have the ability to serve another computing client) in order of ranked preference. For example, suppose that a computing client prefers in-person customer service to automated customer service, and suppose that the computing client prefers audible/verbal customer service to textual customer service. In such case, the computing client would prefer computing touchpoints in the following order from most preferential to least preferential: telephone call with a customer service representative, internet chat with a customer service representative, interactive voice response, and chatbot. Furthermore, suppose that the available telephone lines with customer service representatives are overloaded and/or at maximum capacity while the available internet chats with customer service representatives are not yet loaded to maximum capacity. In such case, the second machine learning classifier can recommend the internet chat as the next computing touchpoint (e.g., internet chatting with a customer service representative can be the most preferred computing touchpoint of the available computing touchpoints that have additional load capacity). In various aspects, any other suitable load-balancing paradigm can be implemented in conjunction with tiered and/or ranked preferences of the computing client.

In some cases, embodiments of the subject innovation can recommend as a next computing touchpoint only those computing touchpoints that have a sufficiently high likelihood of successfully resolving the predicted negative event, in order of ranked preference. For example, suppose a computing client prefers automated customer service to in-person customer service and prefers audible/verbal customer service to textual customer service. In such case, the computing client would prefer computing touchpoints in the following order from most preferential to least preferential: interactive voice response, chatbot, telephone call with a customer service representative, and internet chat with a customer service representative. Furthermore, suppose that the chatbot has an associated probability of success that exceeds a predetermined threshold and that the interactive voice response has an associated probability of success that is below the predetermined threshold (e.g., the interactive voice response can, in some cases, be more susceptible to errors due to a tendency to mishear verbal responses of the computing client). In such case, the second machine learning classifier can recommend the chatbot as the next computing touchpoint (e.g., the chatbot can be the most preferred computing touchpoint of the available computing touchpoints that have a sufficiently high probability of success). In various aspects, any other suitable utility and/or probability-of-success paradigm can be implemented in conjunction with tiered and/or ranked preferences of the computing client. In various aspects, the likelihood of success of a given computing touchpoint can be derived statistically based on prior, recorded computing touchpoint journeys (e.g., based on statistical correlations between computing touchpoints and past successful and/or unsuccessful resolutions).

In various embodiments, the profile data can include demographic information, and computing touchpoint preferences can be derived based on the demographic information. For example, the profile data can, in some instances, include age of the computing client, and the second machine learning classifier can infer that younger computing clients are more likely to be satisfied with automated customer service and/or textual customer service while elderly computing clients are more likely to prefer in-person customer service and/or audible/verbal customer service. As another example, the profile data can, in some instances, include culture, ethnicity, and/or country of origin/residence of the computing client, and the second machine learning classifier can infer that particular cultures, ethnicities, and/or countries of origin/residence prefer using particular computing touchpoints over other computing touchpoints. In various aspects, such preferences can be derived statistically (e.g., based on statistical correlations between computing touchpoints and cultures, ethnicities, and/or countries of origin/residence). In various embodiments, ranked preferences can be inputted and/or provided by the computing client.

Various embodiments of the subject innovation can be employed to use hardware and/or software to solve problems that are highly technical in nature (e.g., to facilitate dynamic computing touchpoint journey recommendation), that are not abstract and that cannot be performed as a set of mental acts by a human. Further, some of the processes performed can be performed by a specialized computer (e.g., trained machine learning classifiers) for carrying out defined tasks related to dynamic computing touchpoint journey recommendation (e.g., receiving a computing context of a client and a computing profile of the client, wherein the client is engaged in a computing touchpoint journey; predicting, via a first machine learning classifier, a negative event likely to occur on the computing touchpoint journey, wherein the first machine learning classifier receives as input the computing context and the computing profile and generates as output the predicted negative event; recommending in real-time, via a second machine learning classifier, a computing touchpoint to which to transfer the client, wherein the second machine learning classifier receives as input the computing context, the computing profile, and the predicted negative outcome and generates as output the recommended next computing touchpoint; recording computing touchpoint journeys traversed by various clients and training the first and second machine learning classifiers on the recorded computing touchpoint journeys). Such defined tasks are not conventionally performed manually by humans. Moreover, neither the human mind nor a human with pen and paper can execute or train machine learning classifiers. Instead, various embodiments of the subject innovation are inherently and inextricably tied to computer technology and cannot be implemented outside of a computing environment (e.g., embodiments of the subject innovation constitute a computerized system that dynamically recommends next computing touchpoints for a particular computing client, wherein the recommendations are tailored to the particular computing client based on machine learning).

In various instances, embodiments of the invention can integrate into a practical application the disclosed teachings regarding dynamic computing touchpoint journey recommendation. Indeed, in various embodiments, the disclosed teachings can provide a computerized system that receives defined input data, analyzes that defined input data with specified machine learning models, and generates as output recommended computing touchpoints to which to direct a computing client. In various embodiments, the computerized system can actually direct and/or transfer the computing client to the recommended computing touchpoint. Such a computerized system can result in computing touchpoint journeys that are dynamically tailored to particular computing clients. Moreover, such a computerized system can eliminate and/or ameliorate the need to iteratively redesign, rebuild, and/or reprogram computing touchpoints (e.g., instead of having to reprogram computing touchpoints based on insights derived from computing touchpoint journey analyses, the parameters of the first and second machine learning classifiers can simply be updated in an online fashion through backpropagation; updating the first and second machine learning classifiers in this way can facilitate changing how and/or which computing touchpoints are recommended without requiring extensive redesigning and/or reprogramming of the computing touchpoints themselves). This elimination and/or reduction in iterative reprogramming certainly constitutes a technical improvement in the field of computing touchpoint journey facilitation. Thus, embodiments of the subject innovation clearly constitute a useful and practical application of computers.

Furthermore, various embodiments of the subject innovation can control real-world devices based on the disclosed teachings. For example, embodiments of the innovation can be implemented as a real-world computerized system that leverages a first real-world machine learning classifier and a second real-world machine learning classifier. In various embodiments, a real-world computing client can engage in a real-world computing touchpoint journey in a real-world computerized transaction system. In various aspects, the first real-world machine learning classifier can receive as input context data and profile data pertaining to the real-world computing client. Based on the context data and profile data, the first real-world machine learning classifier can generate as real-world output a negative event that is likely to occur during the computing touchpoint journey of the computing client. In various aspects, the second real-world machine learning classifier can receive as input the context data, the profile data, and the predicted negative event. Based on the context data, the profile data, and the predict negative event, the second real-world machine learning classifier can generate as real-world output a recommended computing touchpoint to which to direct and/or transfer the real-world computing client. In various aspects, an execution component can actually direct and/or actually transfer the computing client to the recommended computing touchpoint. In various embodiments, a real-world electronic message indicating the recommended next computing touchpoint can be presented (e.g., visually, audibly, tactilely) to the computing client.

FIG. 1 illustrates a high-level block diagram of an example, non-limiting system 100 that can facilitate dynamic computing touchpoint journey recommendations in accordance with one or more embodiments described herein. As shown, a client 104 can engage in a computing touchpoint journey through a set of computing touchpoints 106. In various aspects, a computing touchpoint journey recommendation system 102 can dynamically change and/or tailor the computing touchpoint journey of the client 104 by recommending one or more next computing touchpoints from the set of computing touchpoints 106 to which to direct and/or transfer the client 104.

In various embodiments, the client 104 can be any suitable entity (e.g., machine, artificially intelligent robot/program, human via a desktop computer, human via a laptop computer, human via a mobile device, human via a tablet device, and/or otherwise) that has an objective to be fulfilled and/or furthered and which can electronically, digitally, and/or remotely interact with the set of computing touchpoints 106. In various aspects, the client 104 can be communicatively coupled to the set of computing touchpoints 106 via any suitable wired and/or wireless electronic connection.

In various embodiments, the set of computing touchpoints 106 can include N computing touchpoints for any suitable integer N (e.g., computing touchpoint 1, . . . , computing touchpoint N). In various aspects, a computing touchpoint of the set of computing touchpoints 106 can be any suitable computerized service, any suitable computerized program, any suitable computerized application, and/or any other suitable combination of computer hardware and/or software that possesses executable functionality and with which the client 104 can remotely, electronically, and/or digitally interact. In some instances, a computing touchpoint of the set of computing touchpoints 106 can be a webpage of a website, a computerized tool on a webpage of a website, a mobile application, a computerized tool on a mobile application, a chatbot, an interactive voice response program, an automated email program, and/or an automated survey program. In various other aspects, a computing touchpoint of the set of computing touchpoints 106 can be any suitable channel of electronic and/or digital communication by which the client 104 can interact with an operator, technician, and/or customer service representative. In some instances, a computing touchpoint of the set of computing touchpoints 106 can be an audio connection such as through a telephone, a video connection such as through screen sharing or internet chatting, and/or an audio-video connection such as through video conferencing. In various aspects, the set of computing touchpoints 106 can be communicatively coupled to the computing touchpoint journey recommendation system 102 via any suitable wired and/or wireless electronic connection. In various cases, the set of computing touchpoints 106 can be considered as the set of all available computing touchpoints in a computerized transaction system, any suitable set and/or subset of which can be traversed by the client 104 during the computing touchpoint journey.

In various embodiments, the computing touchpoint journey recommendation system 102 can comprise a processor 108 (e.g., computer processing unit, microprocessor) and a computer-readable memory 110 that is operably and/or operatively and/or communicatively connected/coupled to the processor 108. The memory 110 can store computer-executable instructions which, upon execution by the processor 108, can cause the processor 108 and/or other components of the computing touchpoint journey recommendation system 102 (e.g., input component 112, prediction component 114, decision component 116) to perform one or more acts. In various embodiments, the memory 110 can store computer-executable components (e.g., input component 112, prediction component 114, decision component 116), and the processor 108 can execute the computer-executable components.

In various embodiments, the computing touchpoint journey recommendation system 102 can comprise an input component 112. In various aspects, the input component can electronically, digitally, and/or remotely receive from one or more computing touchpoints of the set of computing touchpoints 106 context data and/or profile data pertaining to the client 104. As explained above, the context data can, in various instances, include information that characterizes the computing touchpoint journey of the client 104. For instance, the context data can, in some cases, include identification of a currently visited computing touchpoint of the set of computing touchpoints 106, identification of one or more previously visited computing touchpoints of the set of computing touchpoints 106, identification of an objective of the computing touchpoint journey, and/or identification of a device modality (e.g., desktop computer, laptop computer, tablet device, mobile device, other smart device) of the client 104. As also explained above, the profile data can, in various instances, include information that characterizes the client 104. For instance, the profile data can, in some cases, include identification of demographic information of the client 104 (e.g., age, gender, culture, ethnicity, country of origin/residence), identification of computing touchpoint preferences of the client 104 (e.g., prefers in-person to automated customer service, prefers textual to verbal customer service), and/or identification of payment information of the client 104 (e.g., financial instrument information and/or financial account information). In various aspects, the context data can be recorded and/or updated in real-time by the set of computing touchpoints 106 (e.g., by those computing touchpoints in the set of computing touchpoints 106 that were and/or are visited by the client 104). In various aspects, the profile data can be provided by the client 104 during the computing touchpoint journey and/or can be retrieved from any suitable database, data structure, and/or data warehouse.

In various embodiments, the computing touchpoint journey recommendation system 102 can comprise a prediction component 114. In various aspects, the prediction component 114 can employ a first trained machine learning classifier to predict, forecast, and/or infer a negative event that can and/or is likely to be experienced by the client 104 on the computing touchpoint journey. As explained above, the first trained machine learning classifier can, in various aspects, be trained to receive as input the context data and the profile data and to produce as output the predicted negative event (e.g., the first trained machine learning classifier can be trained to correlate particular pairs of context data and profile data with particular negative events). As mentioned above, a predicted negative event can be any suitable occurrence that is undesirable and/or otherwise contrary to successful resolution of the objective of the client 104 (e.g., payment decline, out-of-stock indication). In various instances, the first machine learning classifier can be any suitable artificial intelligence classification model and/or algorithm (e.g., artificial neural network, naïve Bayes, k-nearest neighbor, decision tree, logistic regression).

In various embodiments, the computing touchpoint journey recommendation system 102 can comprise a decision component 114. In various aspects, the decision component 114 can employ a second trained machine learning classifier to determine, infer, and/or recommend a next computing touchpoint from the set of computing touchpoints 106 for the client 104 to continue the computing touchpoint journey. As explained above, the second trained machine learning classifier can, in various aspects, be trained to receive as input the context data, the profile data, and the predicted negative event and to produce as output the recommended next computing touchpoint (e.g., the second trained machine learning classifier can be trained to correlate particular tuples of context data, profile data, and negative events with particular computing touchpoints that are correlated with successful resolution of the negative events). In various instances, the second machine learning classifier can be any suitable artificial intelligence classification model and/or algorithm (e.g., artificial neural network, naïve Bayes, k-nearest neighbor, decision tree, logistic regression).

Figure 2:
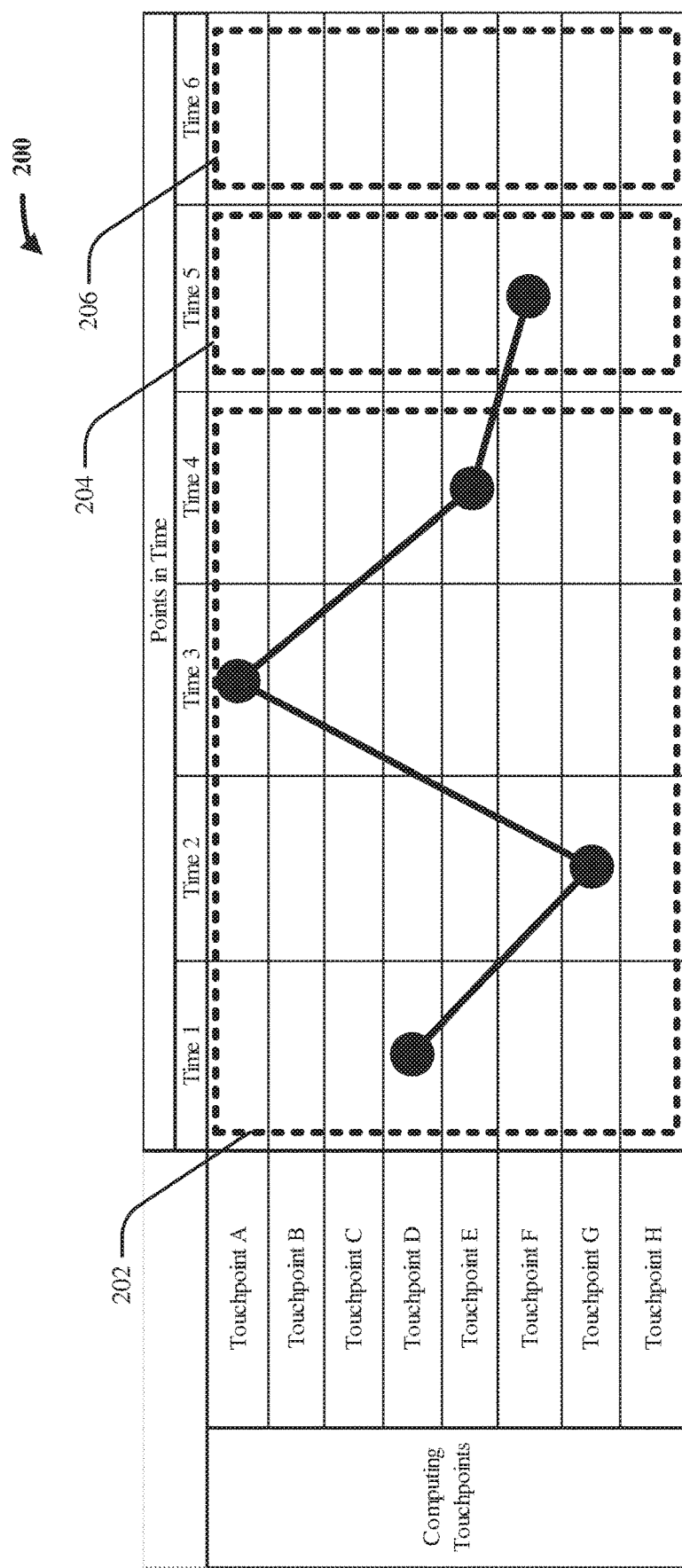
FIG. 2 illustrates a high-level block diagram of an example, non-limiting computing touchpoint journey in accordance with one or more embodiments described herein.

FIG. 2 illustrates a high-level block diagram of an example, non-limiting computing touchpoint journey 200 in accordance with one or more embodiments described herein. As shown in FIG. 2, suppose that the set of computing touchpoints 106 comprises touchpoints A, B, C, D, E, F, G, and H. In various aspects, box 202 can represent previous computing touchpoints visited and/or interacted with by the client 104 at previous time intervals in the computing touchpoint journey, box 204 can represent a current computing touchpoint visited and/or interacted with by the client 104 at a current time interval in the computing touchpoint journey, and box 206 can represent a future time interval in the computing touchpoint journey. In other words, box 202 can depict which computing touchpoints the client 104 has already visited on the computing touchpoint journey, box 204 can depict which computing touchpoint the client 104 is currently visiting, and box 206 can depict a future time interval that has not yet occurred in the computing touchpoint journey. Although six time intervals and eight computing touchpoints are depicted in FIG. 2, this is non-limiting and for illustration only. In various aspects, a computing touchpoint journey can include any suitable number of computing touchpoints and/or any suitable number of time intervals.

As shown in FIG. 2, the client 104 is engaged in a computing touchpoint journey 200 that started at touchpoint D, then progressed to touchpoint G, then progressed to touchpoint A, then progressed to touchpoint E (e.g., as shown by box 202), and is now currently at touchpoint F (e.g., as shown by box 204). In various aspects, the computing touchpoint journey recommendation system 102 can recommend a next computing touchpoint for the client 104 (e.g., can recommend which of touchpoints A, B, C, D, E, F, G, or H that the client 104 should be directed and/or transferred to in the next time interval, as shown by box 206). In various aspects, the computing touchpoint journey recommendation system 102 can predict a negative event that is likely to occur in the computing touchpoint journey 200 and can recommend a suitable computing touchpoint to handle and/or resolve the predicted negative event before it occurs.

Figure 3:
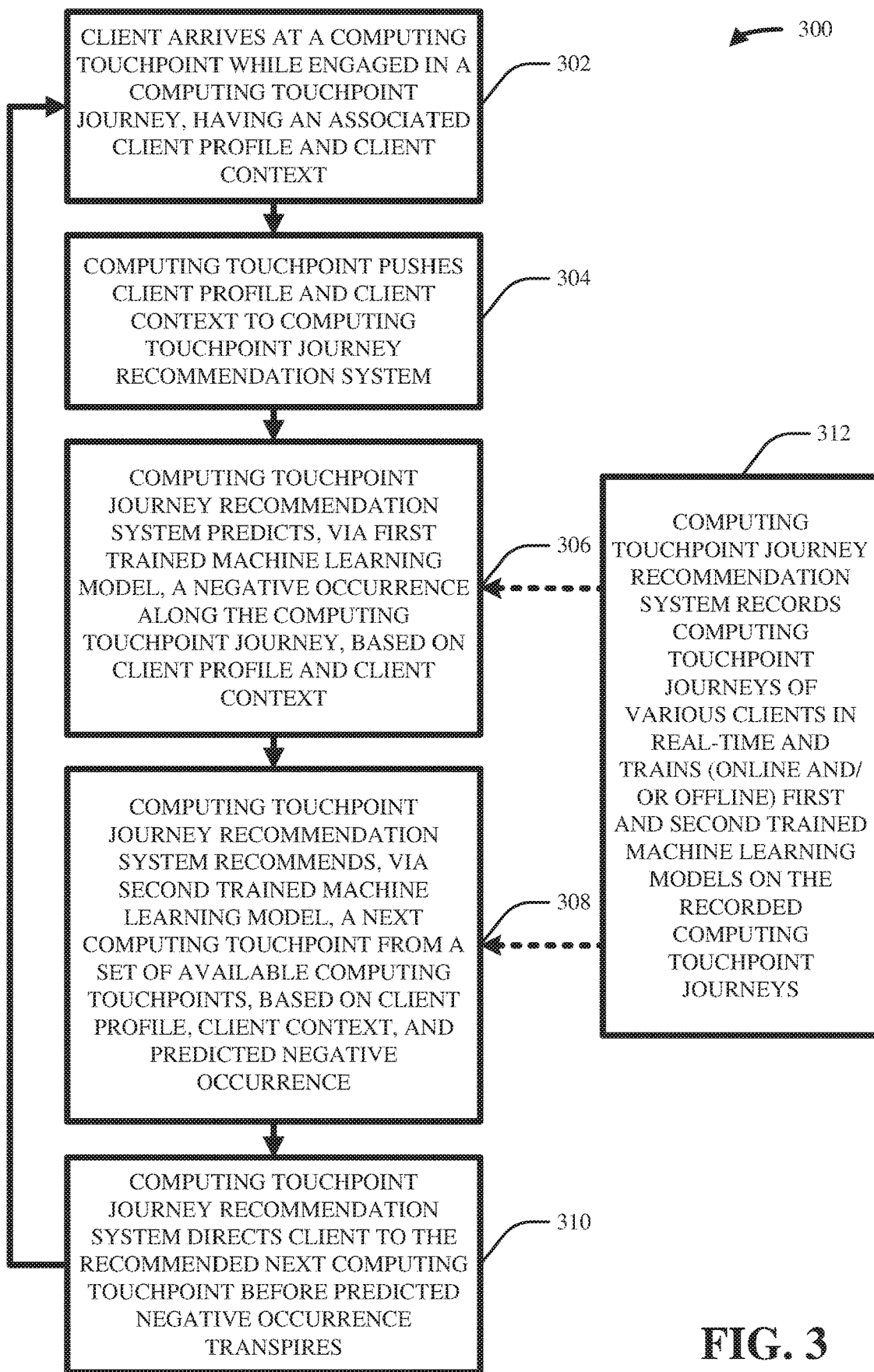
FIG. 3 illustrates a high-level flow diagram of an example, non-limiting computer-implemented method that facilitates dynamic computing touchpoint journey recommendations in accordance with one or more embodiments described herein.

FIG. 3 illustrates a high-level flow diagram of an example, non-limiting computer-implemented method 300 that can facilitate dynamic computing touchpoint journey recommendations in accordance with one or more embodiments described herein. In various aspects, the computer-implemented method 300 can be performed by the system 100. In various embodiments, act 302 can include a client arriving at a computing touchpoint while engaged in a computing touchpoint journey. In various instances, the client can have an associated client profile and/or client context. In various aspects, act 304 can include the computing touchpoint pushing the client profile and/or the client context to the computing touchpoint journey recommendation system. In various cases, act 306 can include the computing touchpoint journey recommendation system predicting, via a first trained machine learning model, a negative occurrence along the computing touchpoint journey, based on the client profile and the client context. In various embodiments, act 308 can include the computing touchpoint journey recommendation system recommending, via a second trained machine learning model, a next computing touchpoint from a set of available computing touchpoints, based on the client profile, the client context, and the predicted negative occurrence. In various instances, act 310 can include the computing touchpoint journey recommendation system directing and/or transferring the client to the recommended next computing touchpoint before the predicted negative occurrence transpires. In some cases, the computing touchpoint journey recommendation system can indicate to the client the identity of the recommended next computing touchpoint via any suitable video, audio, textual, and/or tactile message. In various aspects, acts 302-310 can iterate until the computing touchpoint journey ends. In various aspects, act 312 can include the computing touchpoint journey recommendation system recording computing touchpoint journeys of various clients in real-time and training (e.g., in an online and/or offline fashion) the first and second trained machine learning models on the recorded computing touchpoint journeys.

As explained above, the computer-implemented method 300 can facilitate dynamically making tailored recommendations regarding next computing touchpoints to a computing client (e.g., acts 302-310). Conventional systems/techniques simply do not make such real-time, tailored recommendations. Instead, conventional systems/techniques present the same computing touchpoint options to each computing client, regardless of the idiosyncrasies of different computing clients. Moreover, the recommendations provided by the computer-implemented method 300 can be updated and/or changed in real-time (e.g., act 312) by simply updating the parameters of the first and second trained machine learning models (e.g., via online backpropagation). Iterative redesigning and/or reprogramming of the computing touchpoints themselves are not required, unlike in conventional systems/techniques. For at least these reasons, embodiments of the subject innovation constitute concrete and tangible technical improvements in the field of computing touchpoint journey facilitation.

Figure 4:
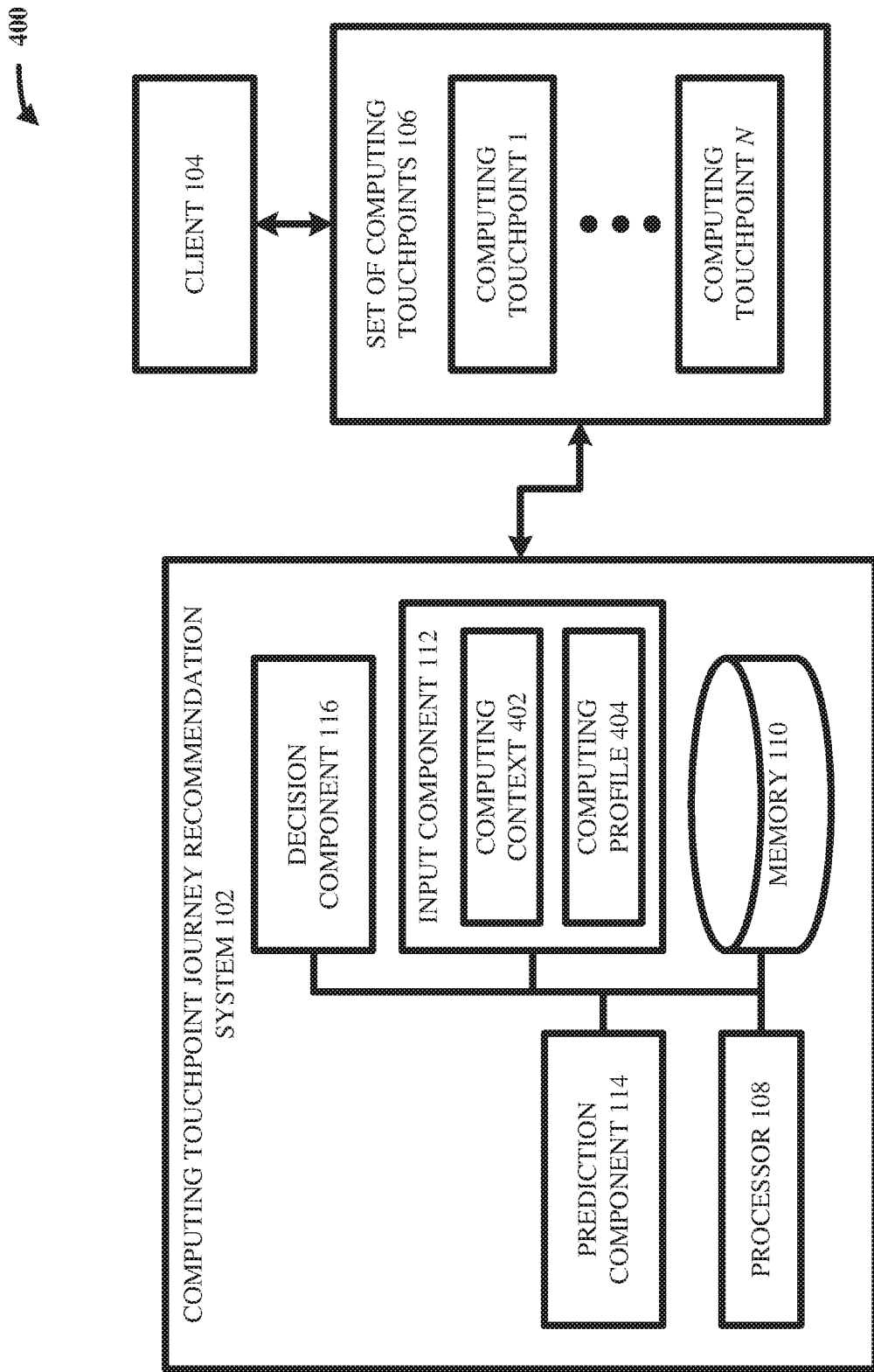
FIG. 4 illustrates a high-level block diagram of an example, non-limiting system including a computing context and a computing profile that facilitates dynamic computing touchpoint journey recommendations in accordance with one or more embodiments described herein.

FIG. 4 illustrates a high-level block diagram of an example, non-limiting system 400 including a computing context and a computing profile that can facilitate dynamic computing touchpoint journey recommendations in accordance with one or more embodiments described herein. As shown, the system 400 can, in various aspects, comprise the same components as the system 100, and can further comprise a computing context 402 and a computing profile 404.

As mentioned above, the input component 112 can, in various aspects, retrieve the computing context 402 and/or the computing profile 404 from the set of computing touchpoints 106 (e.g., from the current computing touchpoint with which the client 104 is currently interacting). In various embodiments, the computing context 402 can include any suitable information that characterizes the computing touchpoint journey of the client 104. For example, the computing context 402 can include an identification of the current computing touchpoint currently visited by the client 104 from the set of computing touchpoints 106 (e.g., box 204 in FIG. 2), an identification of one or more previous computing touchpoints previously visited by the client 104 from the set of computing touchpoints 106 (e.g., box 202 in FIG. 2), an identification of an objective of the client 104 (e.g., to purchase a product and/or service, to schedule delivery of a product and/or performance of a service), and/or an identification of a device modality of the client 104 (e.g., desktop computer, laptop computer, tablet device, mobile device, any other suitable smart device). In various aspects, the computing context 402 can be recorded and/or updated in real-time by the set of computing touchpoints 106 as the computing touchpoint journey of the client 104 progresses (e.g., the computing context 402 can be generated and/or updated by one or more computing touchpoints visited by the client 104).

In various embodiments, the computing profile 404 can include any suitable information that characterizes the client 104. For example, the computing profile 404 can include an identification of demographic information of the client 104 (e.g., age of the client 104, gender of the client 104, profession of the client 104, education level of the client 104, culture/ethnicity of the client 104, country of origin/residence of the client 104), an identification of computing touchpoint preferences of the client 104 (e.g., preferring automated to in-person customer service, preferring textual to audible/verbal customer service), an identification of historical information of the client 104 (e.g. demographics, preferences, and/or any other suitable information inputted by the client 104 during prior computing touchpoint journeys), and/or an identification of financial information of the client 104 (e.g., financial instrument information, financial account information). As mentioned above, the computing profile 404 can, in some cases, include tiered and/or ranked preferences of the client 104. In various aspects, the computing profile 404 can be inputted by the client 104 at any suitable point during the computing touchpoint journey. In various aspects, the computing profile 404 can be retrieved by the input component 112 from any suitable database, data structure, and/or data warehouse (not shown).

Figure 5:
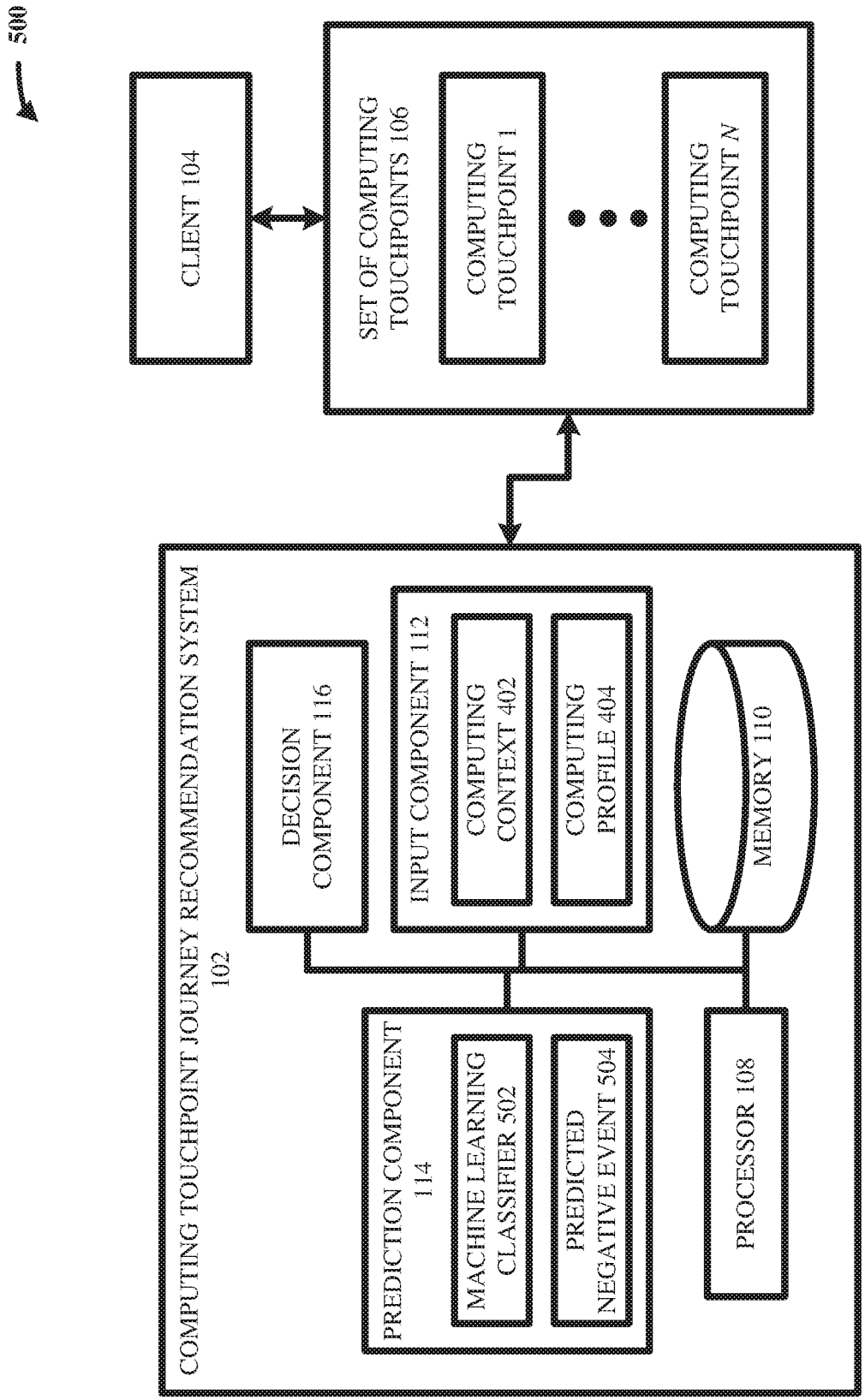
FIG. 5 illustrates a high-level block diagram of an example, non-limiting system including a first machine learning classifier that facilitates dynamic computing touchpoint journey recommendations in accordance with one or more embodiments described herein.

FIG. 5 illustrates a high-level block diagram of an example, non-limiting system 500 including a first machine learning classifier that can facilitate dynamic computing touchpoint journey recommendations in accordance with one or more embodiments described herein. As shown, the system 500 can, in various aspects, comprise the same components as the system 400, and can further comprise a machine learning classifier 502.

In various embodiments, the machine learning classifier 502 can receive as input the computing context 402 and the computing profile 404 and produce as output a predicted negative event 504. In various aspects, the machine learning classifier 502 can employ any suitable linear and/or non-linear classification paradigm and/or technique (e.g., artificial neural networks, naïve Bayes, k-nearest neighbor, decision tree, logistic regression). In various aspects, the machine learning classifier 502 can be considered as a black-box function that is defined by its inputs and its outputs. As mentioned, in various embodiments, the input data that is analyzed by the machine learning classifier 502 can be the computing context 402 and/or the computing profile 404. As also mentioned, in various embodiments, the output data produced by the machine learning classifier 502 can be the predicted negative event 504. In various instances, the predicted negative event 504 can be any suitable occurrence that is undesirable and/or otherwise contrary to the objective of the client 104 (e.g., payment decline). In various aspects, the machine learning classifier 502 can be trained (e.g., via supervised learning, unsupervised learning, reinforcement learning) to correlate particular pairs of input data (e.g., computing context 402 and computing profile 404) with particular output labels (e.g., predicted negative event 504). For example, in some cases, the machine learning classifier 502 can predict that a payment decline is likely to occur where the computing context 402 indicates that the client 104 desires to purchase a product and where the computing profile 404 indicates that the client 104 lacks sufficient funds to purchase the product. In various other cases, the machine learning classifier 502 can predict that a payment decline is likely to occur when the computing profile 404 indicates that certain payment information of the client 104 is expired, when the computing profile 404 and/or the computing context 402 indicate that the country of origin/residence of the client 104 is different from the country in which the client 104 is currently located and/or currently accessing the current computing touchpoint, and/or when the computing context 402 and/or the computing profile 404 present any other contradictory and/or invalid information.

To facilitate some of the above-described machine learning aspects of various embodiments of the subject innovation, consider the following discussion of artificial intelligence (AI). Various embodiments of the present innovation herein can employ artificial intelligence to facilitate automating one or more features of the present innovation. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) of the present innovation, components of the present innovation can examine the entirety or a subset of the data to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, z=(z1, z2, z3, z4, zn), to a confidence that the input belongs to a class, as by f(z)=confidence(class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Figure 6:
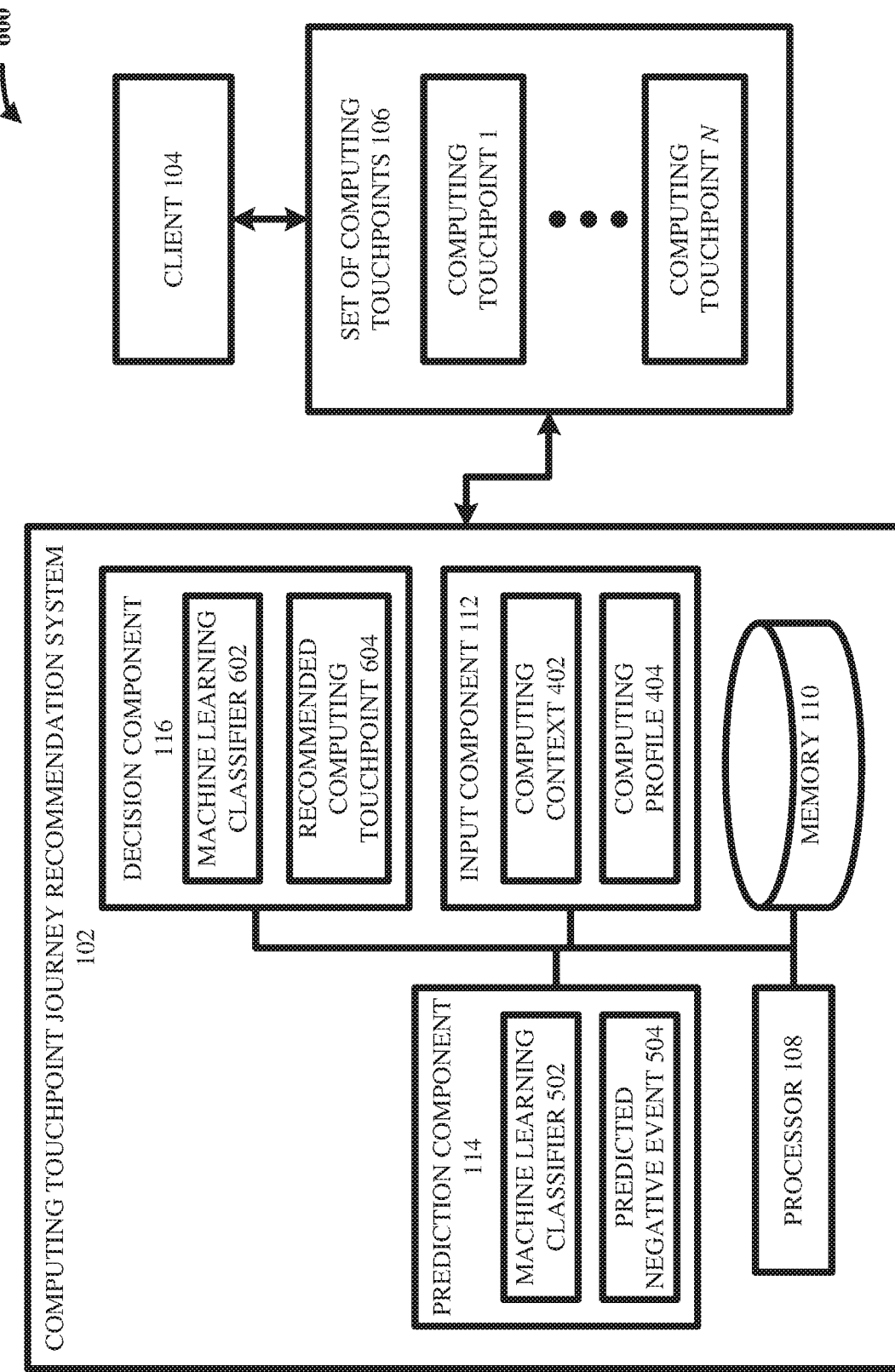
FIG. 6 illustrates a high-level block diagram of an example, non-limiting system including a second machine learning classifier that facilitates dynamic computing touchpoint journey recommendations in accordance with one or more embodiments described herein.

FIG. 6 illustrates a high-level block diagram of an example, non-limiting system 600 including a second machine learning classifier that can facilitate dynamic computing touchpoint journey recommendations in accordance with one or more embodiments described herein. As shown, the system 600 can, in some cases, comprise the same components as the system 500, and can further comprise a machine learning classifier 602.

In various embodiments, the machine learning classifier 602 can receive as input the computing context 402, the computing profile 404, and the predicted negative event 504 and produce as output a recommended computing touchpoint 604. In various aspects, the machine learning classifier 602 can employ any suitable linear and/or non-linear classification paradigm and/or technique (e.g., artificial neural networks, naïve Bayes, k-nearest neighbor, decision tree, logistic regression). In various aspects, the machine learning classifier 602 can be considered as a black-box function that is defined by its inputs and its outputs. As mentioned, in various embodiments, the input data that is analyzed by the machine learning classifier 602 can be the computing context 402, the computing profile 404, and/or the predicted negative event 504. As also mentioned, in various embodiments, the output data produced by the machine learning classifier 602 can be the recommended computing touchpoint 604. In various instances, the recommended computing touchpoint 604 can be any suitable computing touchpoint from the set of computing touchpoints 106 that is sufficiently likely and/or able to handle and/or resolve the predicted negative event 504. In various aspects, the machine learning classifier 602 can be trained (e.g., via supervised learning, unsupervised learning, reinforcement learning) to correlate particular tuples of input data (e.g., computing context 402, computing profile 404, and/or predicted negative event 504) with particular output labels (e.g., recommended computing touchpoint 604). In various instances, the machine learning classifier 602 can be trained to take into account load balancing considerations and/or probability of successful resolution.

For example, the machine learning classifier 602 can be trained to select as the recommended computing touchpoint 604 only those computing touchpoints from the set of computing touchpoints 106 that have a load capacity that is below a predetermined threshold (e.g., the client 104 can prefer a first touchpoint over a second touchpoint, but the machine learning classifier 602 can recommend the second touchpoint if it is not currently loaded to maximum capacity and the first computing touchpoint is already loaded to maximum capacity). As another example, the machine learning classifier 602 can be trained to select as the recommended computing touchpoint 604 only those computing touchpoints from the set of computing touchpoints 106 that have a likelihood of successful resolution that is above a predetermined threshold (e.g., the client 104 can prefer a first touchpoint over a second touchpoint, but the machine learning classifier 602 can recommend the second touchpoint if its likelihood of successful resolution is above the predetermined threshold and the likelihood of successful resolution of the first touchpoint is below the predetermined threshold).

In various aspects, probability of successful resolution of a given computing touchpoint can be derived statistically, as mentioned above. In some cases, the machine learning classifier 602 can be trained to take into account any other suitable information that is available to the machine learning classifier 602, such as device modality used by the client 104 (e.g., if the client 104 is using a mobile phone to interact with the computing touchpoints, interactive voice response and/or telephone calls with customer service representatives can be prioritized; if the client 104 is using a desktop computer to interact with the computing touchpoints, chatbots and/or Internet chats with customer service representatives can be prioritized).

In some cases, the computing touchpoint journey recommendation system 102 can comprise a single machine learning classifier (not shown) that performs the functionality of the machine learning classifier 502 and/or the machine learning classifier 602.

As shown, in various embodiments, the computing touchpoint journey recommendation system 102 can receive as input the computing context 402 and/or the computing profile 404 and can produce as output the recommended computing touchpoint 604. In various aspects, the recommended computing touchpoint 604 can be tailored to the client 104 and/or can be based on any other suitable information (e.g., load balancing, likelihood of successful resolution, client preferences, client demographics, device modality). As explained above, conventional systems/techniques simply do not produce such tailored recommendations in real-time.

Figure 7A:
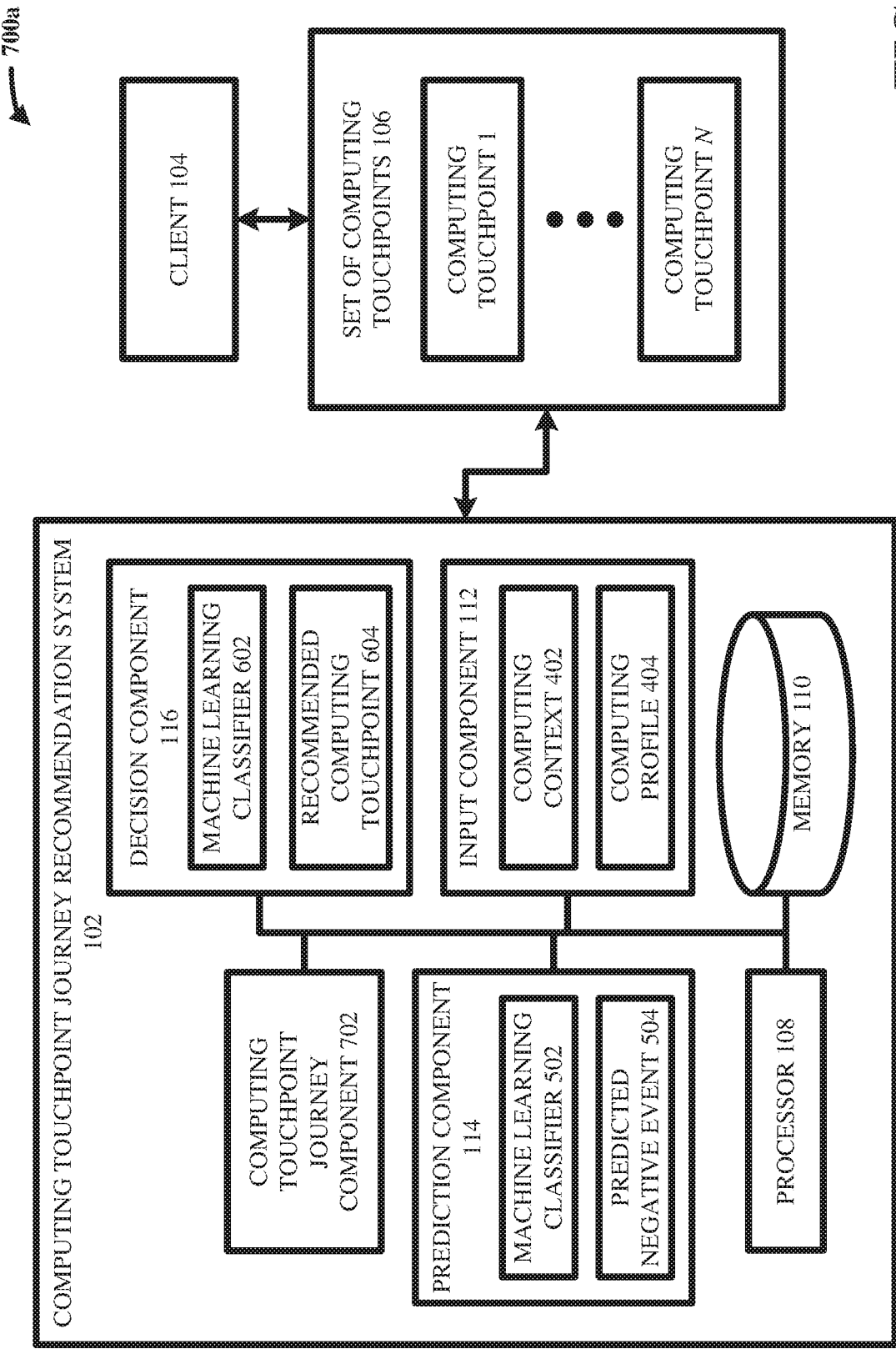
FIGS. 7a-7b illustrate a high-level block diagram of an example, non-limiting system including a computing touchpoint journey component that facilitates dynamic computing touchpoint journey recommendations in accordance with one or more embodiments described herein.
Figure 7B:
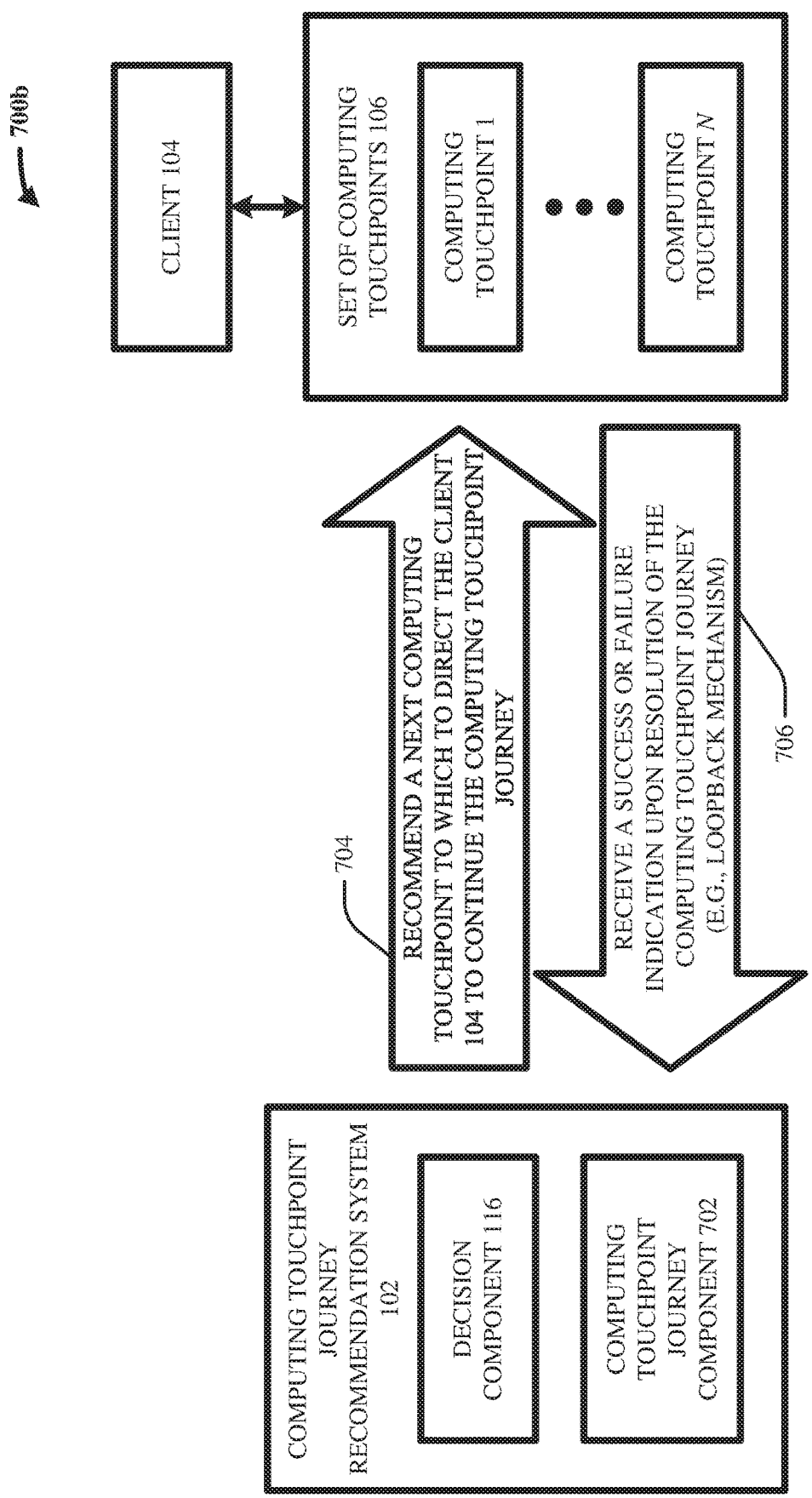

FIGS. 7a-7b illustrate high-level block diagrams of example, non-limiting systems 700a and 700b including a computing touchpoint journey component that can facilitate dynamic computing touchpoint journey recommendations in accordance with one or more embodiments described herein. As shown, the system 700a can, in some instances, comprise the same components as the system 600, and can further comprise the computing touchpoint journey component 702.

In various embodiments, the computing touchpoint journey component 702 can log, record, aggregate, and/or otherwise document computing touchpoint journeys traversed by various clients (e.g., by the client 104 and/or by other clients interacting with the set of computing touchpoints 106) and can train the machine learning classifier 502 and/or the machine learning classifier 602 on the logged, recorded, aggregated, and/or otherwise documented computing touchpoint journeys. In some instances, the computing touchpoint journey component 702 can log, record, aggregate, and/or otherwise document computing touchpoint journeys in real-time and can actively train (e.g., in an online fashion) the machine learning classifier 502 and/or the machine learning classifier 602 (e.g., can train the classifiers on the logged journeys as the journeys are logged in real-time).

In various instances, the computing touchpoint journey component 702 can be considered as a database (e.g., centralized and/or distributed) that can collect computing touchpoint journey data from the interactions of a plurality of clients (not shown) with the set of computing touchpoints 106 and can store that data as training data for the machine learning classifier 502 and/or the machine learning classifier 602. In various instances, each stored computing touchpoint journey can comprise a list of computing touchpoints that were visited by the computing client, a list of negative events that were experienced by the computing client, and/or a label that indicates whether or not the negative events were successfully resolved. In various aspects, the stored computing touchpoint journeys can be labeled and/or annotated by an operator, by a computing client (e.g., via email and/or survey feedback), and/or automatically via any suitable technique. For example, suppose that a computing client with profile X engaged in a computing touchpoint journey that went from touchpoint A to touchpoint B to touchpoint C to touchpoint F to touchpoint D.

Furthermore, suppose that a payment decline issue occurred at touchpoint F and was ultimately resolved at touchpoint D. In such case, this particular computing touchpoint journey can be stored in the computing touchpoint journey component 702 and can be used to facilitate online training (e.g., via backpropagation) of the machine learning classifier 502 and/or the machine learning classifier 602. Specifically, this particular computing touchpoint journey constitutes an instance where profile X in combination with the partial journey from touchpoint A to B to C led to the payment decline issue at touchpoint F. Thus, the machine learning classifier 502 can be trained and/or updated to recognize that the combination of profile X with the journey from touchpoint A to B to C is correlated with a future payment decline. Additionally, this particular computing touchpoint journey constitutes an instance where profile X in combination with the partial journey from touchpoint A to B to C and the future payment decline was successfully resolved by the computing touchpoint D. Thus, the machine learning classifier 602 can be trained and/or updated to recognize that the combination of profile X, the journey from touchpoint A to B to C, and a future payment decline is correlated with successful resolution at touchpoint D.

In various instances, the computing touchpoint journey component 702 can enable the machine learning classifier 502 and/or the machine learning classifier 602 to actively learn in real-time. In various aspects, this enables the recommendations produced by the computing touchpoint journey recommendation system 102 to be updated and/or improved simply through online training of the machine learning classifier 502 and/or the machine learning classifier 602. Unlike conventional systems/techniques, substantial redesigning and/or reprogramming of the set of computing touchpoints 106 themselves is not needed. Thus, the computing touchpoint journey recommendation system 102 can dynamically change, update, and/or improve how it recommends computing touchpoints without the iterative and time-consuming reprogramming process that plagues conventional systems/techniques.

That is, in various embodiments, the computing touchpoint journey component 702 can facilitate a feedback mechanism and/or feedback loop that can be used to improve the parameters and/or performance of the computing touchpoint journey recommendation system 102 (e.g., that can be used to continually train/update the machine learning classifier 502 and/or the machine learning classifier 602). FIG. 7b helps to illustrate this feedback mechanism. As shown in FIG. 7b and as explained above, the decision component 116 of the computing touchpoint journey recommendation system 102 can recommend a next computing touchpoint to which to direct the client 104 so that the client 104 can continue their current computing touchpoint journey, as denoted by numeral 704. In various embodiments, the computing touchpoint journey component 702 can receive a success and/or failure indication upon resolution of the current computing touchpoint journey of the client 104, as denoted by numeral 706. In various instances, this success and/or failure indication can be used as a known label and/or known classification for training/updating the decision component 116 and/or the prediction component 114. For example, suppose that the client 104 has a particular computing context A and a particular computing profile B. Furthermore, suppose that the prediction component predicts that a negative event C will occur based on the computing context A and the computing profile B. Further still, suppose that the decision component 116 recommends the computing touchpoint D as the next computing touchpoint to handle the predicted negative event C before it occurs. In various instances, the client 104 can be directed to the computing touchpoint D, and the current computing touchpoint journey can eventually come to a resolution. In various cases, the computing touchpoint journey component 702 can receive a signal and/or message indicating whether the resolution was successful and/or unsuccessful. In various aspects, this resolved computing touchpoint journey can be used as training data for the prediction component 114 and/or the decision component 116. Specifically, if the negative event C did ultimately occur on the computing touchpoint journey, the prediction component 114 can be updated (e.g., via backpropagation) to learn and/or reinforce that the data pair comprising computing context A and computing profile B is associated and/or correlated with the predicted negative event C. Similarly, if the resolution of the computing touchpoint journey is successful, the decision component 116 can be updated (e.g., via backpropagation) to learn that the data tuple comprising computing context A, computing context B, and the predicted negative event C is associated and/or correlated with the computing touchpoint D. On the other hand, if the negative event C did not ultimately occur on the computing touchpoint journey, the prediction component 114 can be updated (e.g., via backpropagation) to learn that the data pair comprising computing context A and computing profile B is not associated and/or correlated with the negative event C. If the negative event C did ultimately occur on the computing touchpoint journey but the resolution of the computing touchpoint journey is unsuccessful, the decision component 116 can be updated (e.g., via backpropagation) to learn that the data tuple comprising computing context A, computing profile B, and the predicted negative event C is not associated and/or correlated with the computing touchpoint D. In other words, the computing touchpoint journey component 702 can receive feedback which can be used to provide better recommendations in the future.

In various aspects, such feedback and/or training can be facilitated by the computing touchpoint journey component 702. In various aspects, the success and/or failure with respect to the predictions and/or recommendations can be used to better train the machine learning models. In various aspects, the machine learning models employed by the computing touchpoint journey recommendation system 102 can consume and/or learn from behavioral data (e.g., context and/or profile) from computing touchpoint journeys of the client 104.

Figure 8:
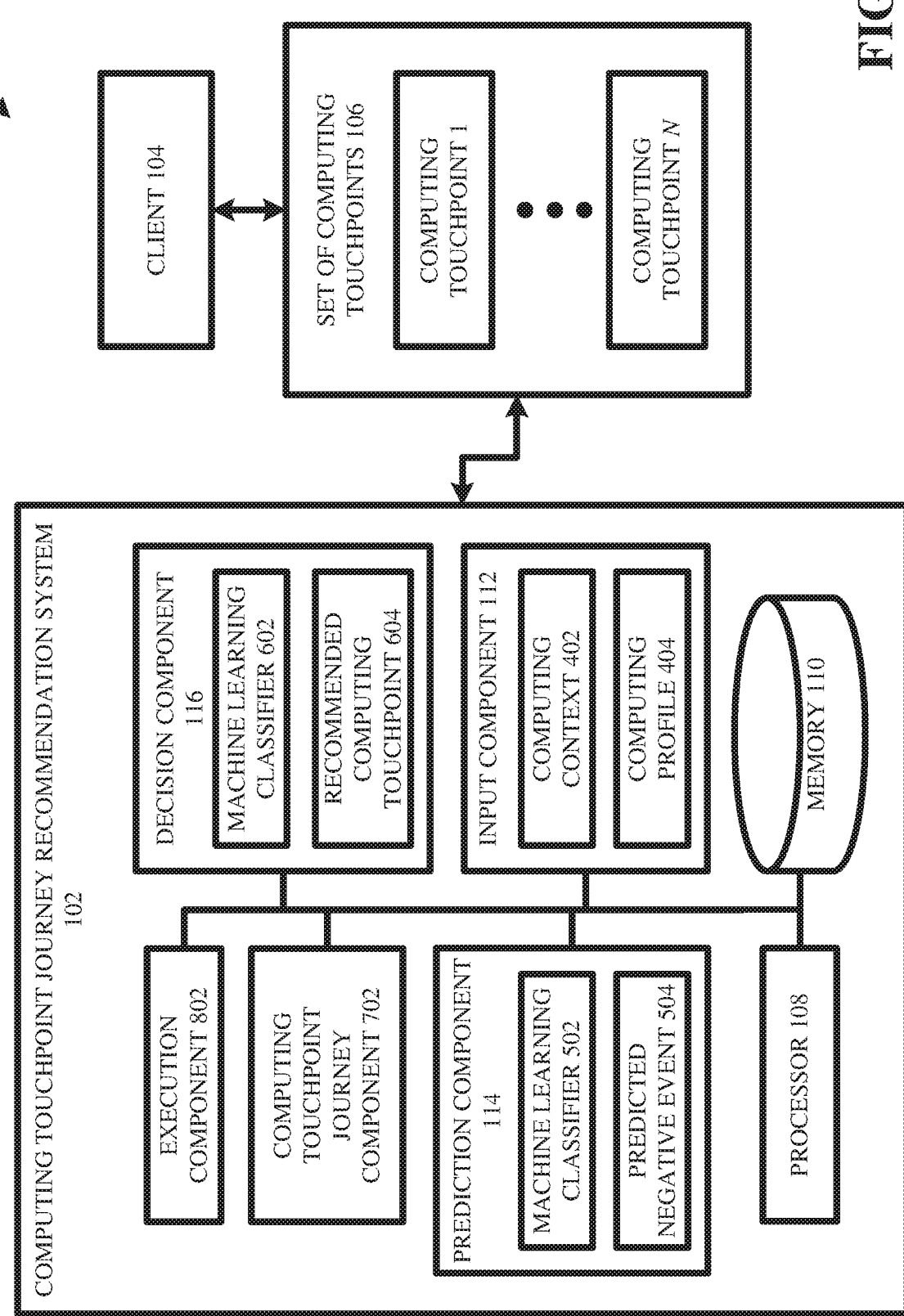
FIG. 8 illustrates a high-level block diagram of an example, non-limiting system including an execution component that facilitates dynamic computing touchpoint journey recommendations in accordance with one or more embodiments described herein.

FIG. 8 illustrates a high-level block diagram of an example, non-limiting system 800 including an execution component that can facilitate dynamic computing touchpoint journey recommendations in accordance with one or more embodiments described herein. As shown, the system 800 can, in some aspects, comprise the same components as the system 700, and can further comprise an execution component 802.

In various embodiments, the execution component 802 can actually direct, drive, and/or transfer the client 104 to the recommended computing touchpoint 604 (e.g., the execution component 802 can connect the client 104 to a chatbot program, to an interactive voice response program, to a phone call with a customer service representative). In various other embodiments, the execution component 802 can visually, audibly, and/or tactilely present a message to the client 104 (e.g., via a computer screen/monitor, via computer speakers) that indicates and/or identifies the recommended computing touchpoint 604. Thus, in various aspects, the computing touchpoint journey recommendation system 102 can actually accomplish a real-world result.

Figure 9:
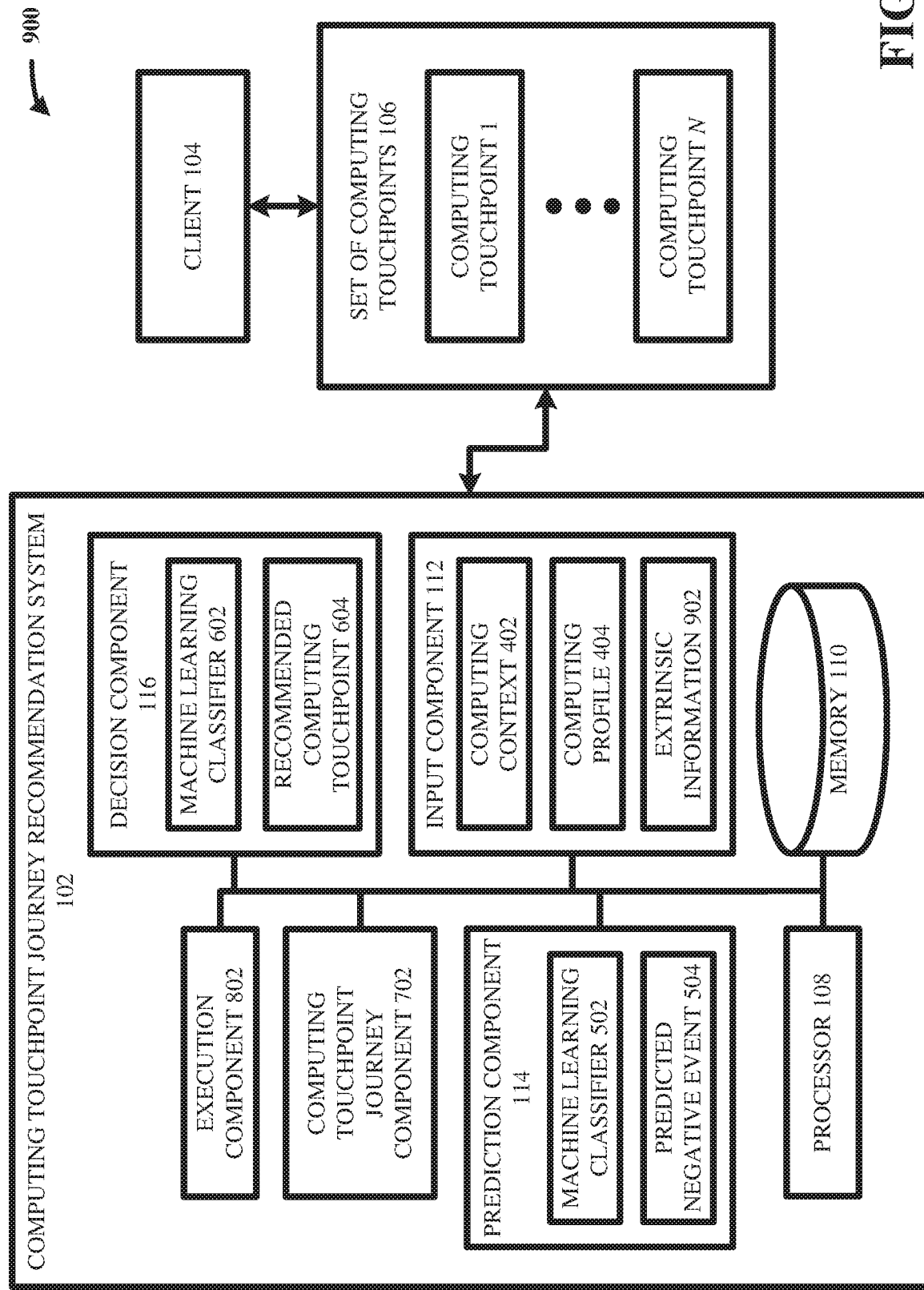
FIG. 9 illustrates a high-level block diagram of an example, non-limiting system including extrinsic information that facilitates dynamic computing touchpoint journey recommendations in accordance with one or more embodiments described herein.

FIG. 9 illustrates a high-level block diagram of an example, non-limiting system 900 including extrinsic information that can facilitate dynamic computing touchpoint journey recommendations in accordance with one or more embodiments described herein. As shown, the system 900 can, in some aspects, comprise the same components as the system 800, and can further comprise extrinsic information 902.

In various embodiments, the input component 112 can further receive the extrinsic information 902. In various instances, the extrinsic information 902 can be associated with an environment of the client 104 and/or a geographic location of the client 104. In various instances, the machine learning classifier 502 and/or the machine learning classifier 602 can receive as input the extrinsic information 902. In various instances, the extrinsic information 902 can include any other suitable information not already captured in the computing context 402 and/or the computing profile 404. In some instances, the extrinsic information 902 can include information mined from news sources and/or social media sources that can affect the computing touchpoint journey of the client 104. In some cases, the extrinsic information 902 can include economic conditions, public health conditions, weather conditions, and/or legislation/regulatory conditions that affect the geographic location of the client 104 (e.g., if the geographic location of the client 104 passes a new law that prohibits a particular type of computing touchpoint, the machine learning classifier 602 can take that information into account so as to not recommend that prohibited computing touchpoint; if socioeconomic, public health, and/or weather conditions in the geographic location of the client 104 reduce the effectiveness of a particular computing touchpoint and/or increase the administrative costs of a particular computing touchpoint, the machine learning classifier 602 can take that information into account when determining the recommended computing touchpoint 604).

Figure 10:
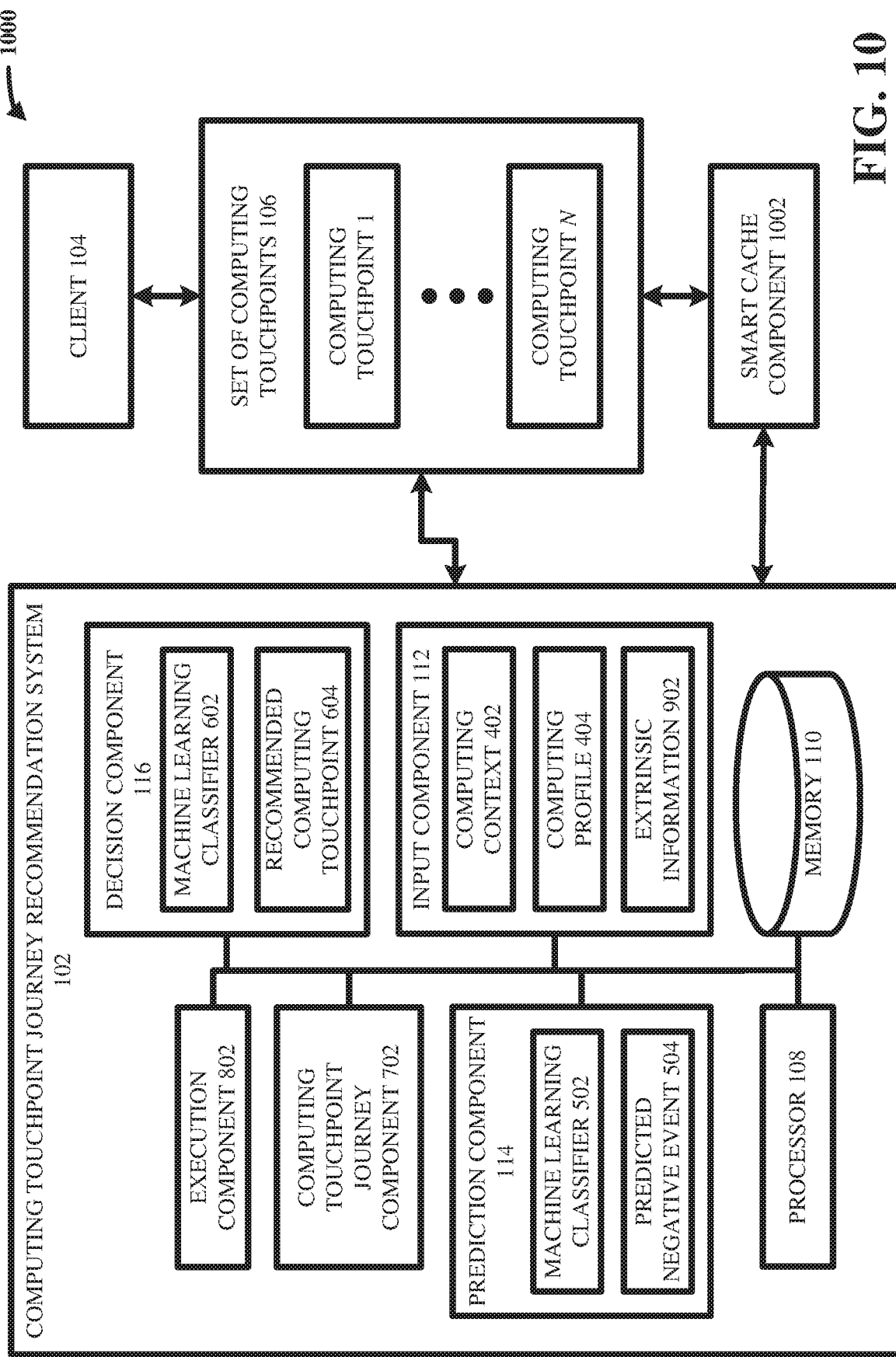
FIG. 10 illustrates a high-level block diagram of an example, non-limiting system including a smart cache component that facilitates dynamic computing touchpoint journey recommendations in accordance with one or more embodiments described herein.

FIG. 10 illustrates a high-level block diagram of an example, non-limiting system 1000 including a smart cache component that can facilitate dynamic computing touchpoint journey recommendations in accordance with one or more embodiments described herein. As shown, the system 1000 can, in some aspects, comprise the same components as the system 900, and can further comprise a smart cache component 1002.

In various aspects, a computing touchpoint journey can be an enterprise wide solve for an ensemble of downstream computing touchpoints/channels (e.g., chatbot, interactive voice response, live chat, live telephone call). That is, the client 104 can be on a current computing touchpoint journey, and the goal can be to identify a next computing touchpoint to which to direct the client 104 (e.g., the current computing touchpoint journey can present a "problem" to be solved, and the "solution" can be the recommended next computing touchpoint). In some cases, the set of computing touchpoints 106 can have a substantial and/or high load (e.g., the set of computing touchpoints 106 can be serving multiple clients, the set of computing touchpoints 106 can be busy with transferring context data and/or profile data to multiple services). In various aspects, the smart cache component 1002 can reside with the set of computing touchpoints 106 to improve efficiencies, such as reducing latency and/or system load. For example, suppose that the client 104 visits a particular computing touchpoint (e.g., interactive voice response) of the set of computing touchpoints 106 to resolve a particular negative event (e.g., failure to add a credit card or other financial instrument). Further, suppose that the particular computing touchpoint provides the client 104 with a particular resolution option, which the client 104 accepts to resolve the particular negative event. In various cases, this information and/or transaction can be stored in the smart cache component 1002 for any suitable amount of time. In various embodiments, the input component 112 can request any suitable amount of information (e.g., some and/or all of the computing context 402, some and/or all of the computing profile 404) from the smart cache component 1002, rather than querying the set of computing touchpoints 106 for such information. This can, in various instances, help to optimize load balancing, improve efficiency, and/or reduce latency (e.g., the set of computing touchpoints 106 can avoid having to expend time and/or resources responding to queries from the input component 112 and/or pushing information to the input component 112).

Figure 11:
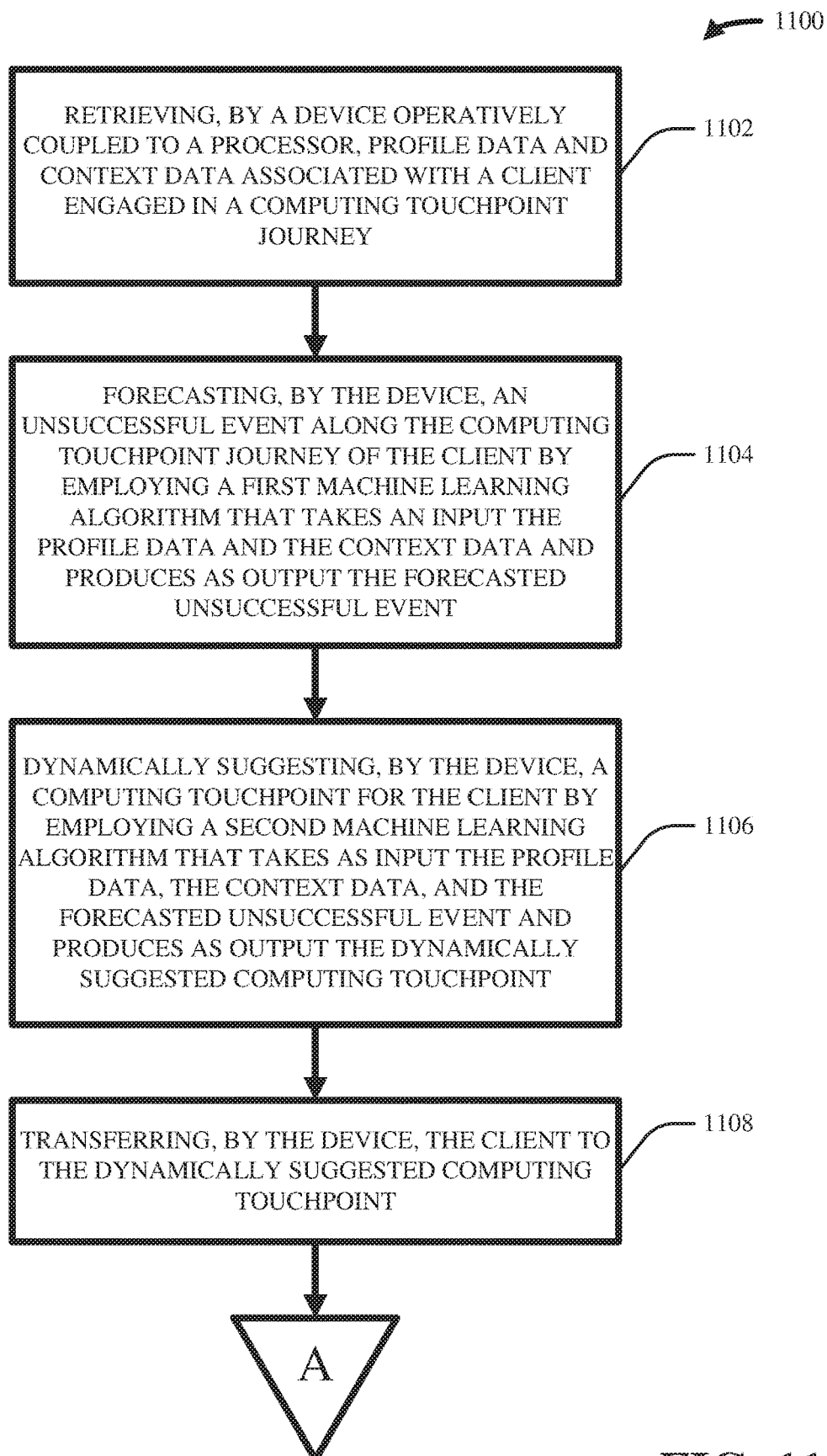
FIG. 11 illustrates a high-level flow diagram of an example, non-limiting computer-implemented method that facilitates dynamic computing touchpoint journey recommendations in accordance with one or more embodiments described herein.

FIG. 11 illustrates a high-level flow diagram of an example, non-limiting computer-implemented method 1100 that can facilitate dynamic computing touchpoint journey recommendations in accordance with one or more embodiments described herein.

In various embodiments, act 1102 can include retrieving, by a device operatively coupled to a processor (e.g., computing touchpoint journey recommendation system 102, processor 108, and/or input component 112), profile data (e.g. 404) and context data (e.g., 402) associated with a client (e.g., 104) engaged in a computing touchpoint journey.

In various instances, act 1104 can include forecasting, by the device (e.g., computing touchpoint journey recommendation system 102, processor 108, and/or prediction component 114), an unsuccessful event (e.g., 504) along the computing touchpoint journey of the client by employing a first machine learning algorithm (e.g., 502) that takes as input the profile data and the context data and produces as output the forecasted unsuccessful event.

In various aspects, act 1106 can include dynamically suggesting, by the device (e.g., computing touchpoint journey recommendation system 102, processor 108, and/or decision component 116), a computing touchpoint (e.g., 604) for the client by employing a second machine learning algorithm (e.g., 602) that takes as input the profile data, the context data, and the forecasted unsuccessful event and produces as output the dynamically suggested computing touchpoint.

In various cases, act 1108 can include transferring, by the device (e.g., computing touchpoint journey recommendation system 102, processor 108, and/or execution component 802), the client to the dynamically suggested computing touchpoint.

Figure 12:
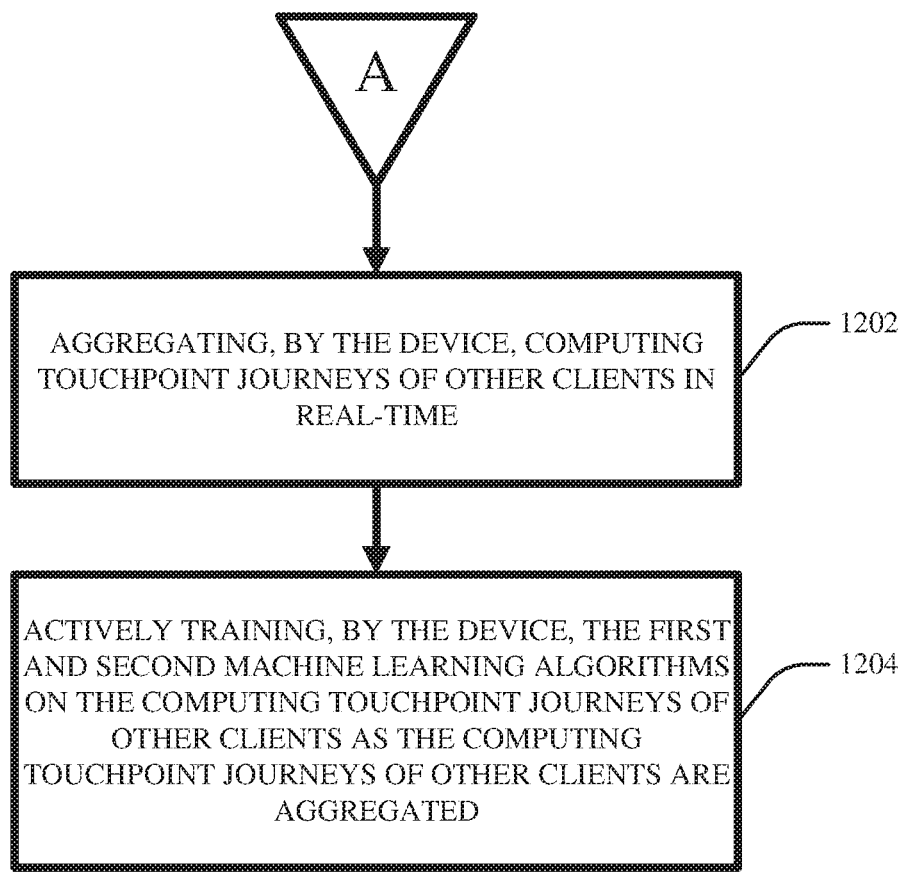
FIG. 12 illustrates a high-level flow diagram of an example, non-limiting computer-implemented method that facilitates dynamic computing touchpoint journey recommendations in accordance with one or more embodiments described herein.

FIG. 12 illustrates a high-level flow diagram of an example, non-limiting computer-implemented method 1200 that can facilitate dynamic computing touchpoint journey recommendations in accordance with one or more embodiments described herein. As shown, the computer-implemented method 1200 can, in various embodiments, comprise the same acts as the computer-implemented method 1100, and can further comprise acts 1202-1204.

In various embodiments, act 1202 can include aggregating, by the device (e.g., computing touchpoint journey recommendation system 102, processor 108, and/or computing touchpoint journey component 702), computing touchpoint journeys of other clients in real-time.

In various instances, act 1204 can include actively training, by the device (e.g., computing touchpoint journey recommendation system 102, processor 108, and/or computing touchpoint journey component 702), the first and second machine learning algorithms on the computing touchpoint journeys of other clients as the computing touchpoint journeys of other clients are aggregated.

As mentioned above, conventional systems/techniques capture computing touchpoint journeys and apply entirely offline analytical solutions. Specifically, such conventional systems/techniques identify computing client pain points and offer better solutions based on the insights derived. Since the computing touchpoints and the computing touchpoint journey analytics are disconnected, the learned insights are not automatically and/or easily implemented into the computing touchpoints. Instead, the computing touchpoints are iteratively rebuilt, redesigned, and/or reprogrammed based on the derived insights, which can be very costly and time-consuming.

Various embodiments of the subject innovation can address one or more of these issues. In various embodiments, the subject innovation can feed data to the computing touchpoints through a computing touchpoint journey event capture channel or hub (e.g., the computing touchpoint journey recommendation system 102). The hub can be the central place through which the data flows to different computing touchpoints. The same data can be used to build the context to be used in downstream computing touchpoints. This can, in some cases, enable a connection between the computing touchpoint journeys being analyzed and/or captured and the real computing touchpoints and/or computing client experience. This can enable the data in depth to be sent to different computing touchpoints. With this connection, it can be easier to alter the computing touchpoint journeys based on the insights derived (e.g., the new contextual data can, in some cases, flow to all the computing touchpoints in the same way and the computing touchpoint journey can be altered in a consistent fashion and the results can be monitored instantly.

In various instances, an example can be a customer having a payment decline issue. Conventionally, most customers can need to call a call center to resolve issues. If it can be captured that the customer has a payment decline issue and that customers generally call customer service most of the time, this information can be passed to additional customer support applications like chatbot, such that chatbot can be offered in the payment decline page to resolve issues without having the customer call the call center.

In various instances, embodiments of the subject innovation can be considered as delivering a customized and/or omni-channel experience to computing clients. Embodiments of the subject innovation can offer rich data insights on a computing touchpoint journey collated by channel, intent, teammate, customer, and so on to deliver an omnichannel experience. These insights can then be used to optimize and/or improve computing touchpoint journeys across various computing touchpoints. In some instances, embodiments of the subject innovation can link authenticated and unauthenticated users by applying heuristics and an associated confidence level. In some cases, the computing touchpoint journeys can be recorded/captured and can be sourced to a data warehouse for analytics and/or reporting needs.

In various instances, a current computing touchpoint of the client 104 can ask the computing touchpoint journey recommendation system 102 how to respond to the client 104 based on the computing context 402 and/or the computing profile 404 (e.g., the current computing touchpoint can push client context, behavior, previous touchpoints, intent, and so on to the computing touchpoint journey recommendation system 102). In various aspects, the computing touchpoint journey recommendation system 102 can leverage machine learning models to recommend how to respond to the client 104 (e.g., to recommend a next computing touchpoint). In various aspects, the computing touchpoint journey recommendation system 102 can drive, direct, and/or transfer the client 104 to the recommended next computing touchpoint. This can iterate until the computing touchpoint journey of the client 104 ends. In various aspects, a post-issue resolution journey can be initiated via surveys and/or emails to the client 104. In various instances, the computing touchpoint journey component 702 can facilitate a touchpoint-driven online platform that enables the computing touchpoint journey recommendation system 102 to make needed changes and/or updates faster than conventional systems/techniques.

In various instances, the computing touchpoint journey recommendation system 102 can evaluate a current computing touchpoint for possible journey maps, and a recommended channel and/or best next action can be provided. Once a channel is identified to take the client 104, the channel can take over the client 104 and can use best next action to drive the client 104 through a successful journey.

In various instances, predicted negative events can be based on any suitable information and/or scenario. For example, a scenario in which a computing client is in a foreign country and/or has a new IP address that does not match the country and/or IP address of the location where the computing client is attempting to access the computing touchpoints can lead to a predicted payment decline. In various aspects, this scenario can be monitored for a probability of a risk decline if the computing client goes forward with a payment. At that moment of the journey, in some cases, the chatbot can pop up to get additional information from the computing client at the payment page and can pass the additional information to a risk check to avoid a decline during payment processing. Other scenarios are possible (e.g., the regularly-used financial instrument of the computing client is expired, the computing client has a negative balance on their account).

In various aspects, embodiments of the subject innovation can enable monitoring of potential negative events at any suitable and/or every suitable computing touchpoint along a computing touchpoint journey. When a potential negative event is predicted, embodiments of the subject innovation can recommend in real-time a suitable computing touchpoint that can help to handle the predicted negative event before it occurs.

Figure 13:
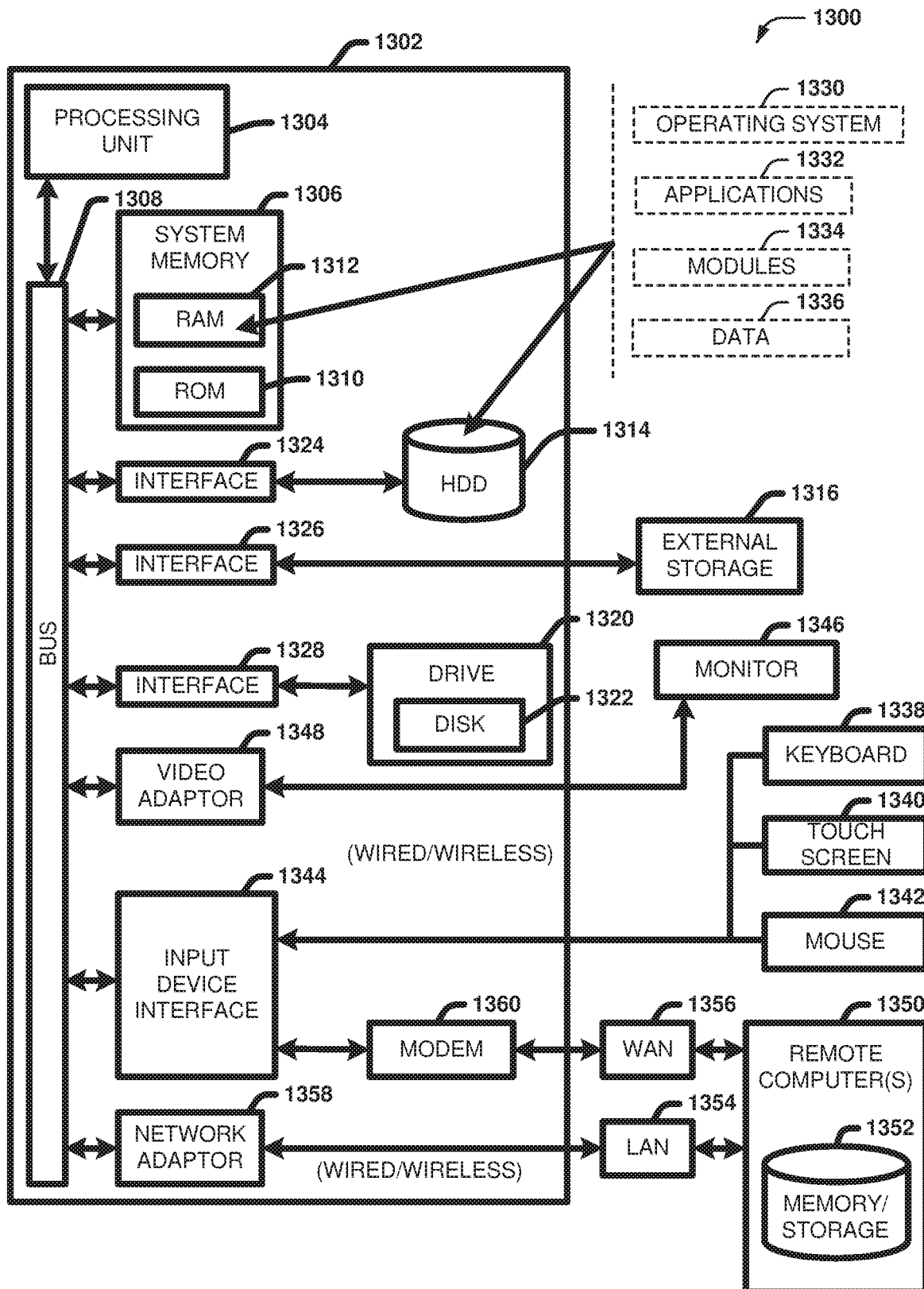
FIG. 13 illustrates a block diagram of an example, non-limiting operating environment in which one or more embodiments described herein can be facilitated.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and a drive 1320, e.g., such as a solid state drive, an optical disk drive, which can read or write from a disk 1322, such as a CD-ROM disc, a DVD, a BD, etc. Alternatively, where a solid state drive is involved, disk 1322 would not be included, unless separate. While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and drive 1320 can be connected to the system bus 1308 by an HDD interface 1324, an external storage interface 1326 and a drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enable with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above, such as but not limited to a network virtual machine providing one or more aspects of storage or processing of information. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 14:
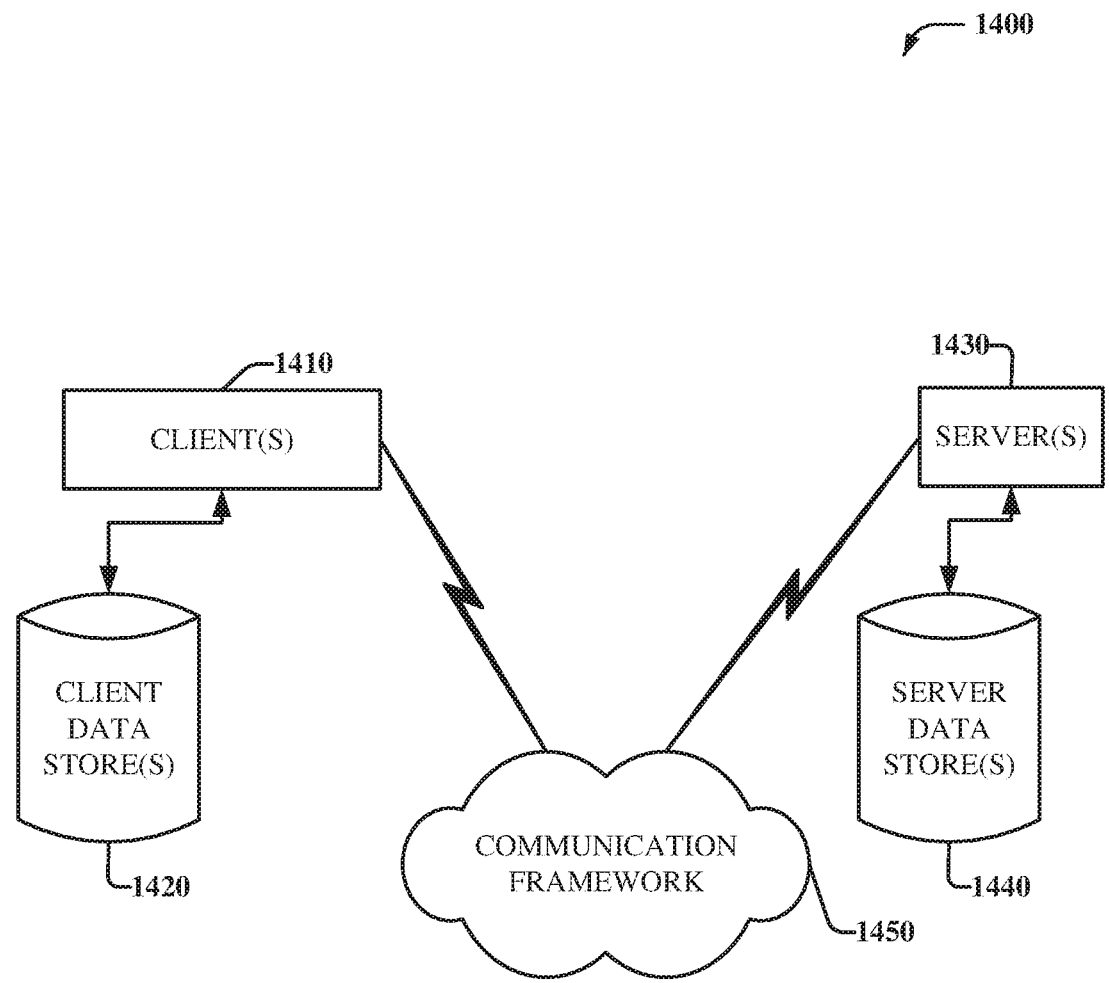
FIG. 14 illustrates an example networking environment operable to execute various implementations described herein.

FIG. 14 is a schematic block diagram of a sample computing environment 1400 with which the disclosed subject matter can interact. The sample computing environment 1400 includes one or more client(s) 1410. The client(s) 1410 can be hardware and/or software (e.g., threads, processes, computing devices). The sample computing environment 1400 also includes one or more server(s) 1430. The server(s) 1430 can also be hardware and/or software (e.g., threads, processes, computing devices). The servers 1430 can house threads to perform transformations by employing one or more embodiments as described herein, for example. One possible communication between a client 1410 and a server 1430 can be in the form of a data packet adapted to be transmitted between two or more computer processes. The sample computing environment 1400 includes a communication framework 1450 that can be employed to facilitate communications between the client(s) 1410 and the server(s) 1430. The client(s) 1410 are operably connected to one or more client data store(s) 1420 that can be employed to store information local to the client(s) 1410. Similarly, the server(s) 1430 are operably connected to one or more server data store(s) 1440 that can be employed to store information local to the servers 1430.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a standalone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor that executes computer-executable components stored in a memory, the computer-executable components comprising:
an input component that receives a computing context of a client and a computing profile of the client, wherein the client is engaged in a computing touchpoint journey, wherein the computing context and the computing profile characterize at least an objective of the client, and wherein the computing context and the computing profile comprise information respective of a financial status of the client;
a prediction component that predicts, via a first machine learning classifier trained based on previous contexts and profiles associated with previous negative events, a negative event likely to occur on the computing touchpoint journey, wherein the first machine learning classifier receives as input the computing context and the computing profile, including the information respective of the financial status of the client, and generates as output the predicted negative event, and wherein the predicted negative event comprises a payment decline based on the financial status; and
a decision component that recommends in real-time, via a second machine learning classifier trained based on previous computing touchpoints that resolved the previous negative events, a recommended computing touchpoint to which to transfer the client to continue the computing touchpoint journey, wherein the second machine learning classifier receives as input the computing context, the computing profile, and the predicted negative event and generates as output the recommended computing touchpoint.

2. The system of claim 1, wherein the computer-executable components further comprise:
a computing touchpoint journey component that records computing touchpoint journeys traversed by various clients and derives the previous contexts and profiles, the previous negative events, and the previous computing touchpoints to train at least one of the first machine learning classifier or the second machine learning classifier.

3. The system of claim 2, wherein the computing touchpoint journey component records computing touchpoint journeys traversed by various clients in real-time and facilitates online training of at least one of the first machine learning classifier or the second machine learning classifier as the computing touchpoint journeys traversed by various clients are recorded.

4. The system of claim 1, wherein the computer-executable components further comprise:
an execution component that transfers the client to the recommended computing touchpoint.

5. The system of claim 1, wherein the computing context includes at least one of a current computing touchpoint visited by the client, a previous computing touchpoint visited by the client, an objective of the client, or a device modality of the client.

6. The system of claim 1, wherein the computing profile includes at least one of an identification of the client, a computing touchpoint preference of the client, an age of the client, an ethnicity of the client, a location of the client, or financial instrument information of the client.

7. The system of claim 1, wherein the decision component selects the recommended computing touchpoint from a set of available computing touchpoints based in part on at least one of a probability of resolving the predicted negative event or a load distribution among the set of available computing touchpoints.

8. The system of claim 1, wherein the input component further receives extrinsic information associated with an environment of the client, and wherein the first and second machine learning classifiers receive as input the extrinsic information.

9. A computer-implemented method, comprising:
retrieving, by a device operatively coupled to a processor, profile data and context data associated with a client engaged in a computing touchpoint journey, wherein the profile data and context data characterize at least an objective of the client and are particular to at least a financial status of the client, and wherein the profile data and context data comprise information respective of a capability of the client;
forecasting, by the device, an unsuccessful event along the computing touchpoint journey of the client by employing a first machine learning algorithm that takes as input the profile data and the context data, including the information respective of the capability of the client, and produces as output the forecasted unsuccessful event, wherein the first machine learning algorithm is trained based on previous contexts and profiles associated with previous unsuccessful events; and
dynamically suggesting, by the device, a computing touchpoint for the client by employing a second machine learning algorithm that takes as input the profile data, the context data, the capability of the client, and the forecasted unsuccessful event and produces as output the dynamically suggested computing touchpoint, wherein the second machine learning algorithm is trained based on previous computing touchpoints that resolved the previous unsuccessful events.

10. The computer-implemented method of claim 9, further comprising:
aggregating, by the device, computing touchpoint journeys of other clients in real-time; and
deriving, by the device and from the aggregated computing touchpoint journeys, the previous contexts and profiles, the previous unsuccessful events, and the previous computing touchpoints to train the first and second machine learning algorithms as the computing touchpoint journeys of other clients are aggregated.

11. The computer-implemented method of claim 9, further comprising:
transferring, by the device, the client to the dynamically suggested computing touchpoint.

12. The computer-implemented method of claim 9, wherein the dynamically suggesting the computing touchpoint comprises selecting, from a set of available computing touchpoints, a computing touchpoint having a likelihood of successful resolution of the forecasted unsuccessful event above a predetermined threshold.

13. The computer-implemented method of claim 9, wherein the dynamically suggesting the computing touchpoint comprises selecting, from a set of available computing touchpoints, a computing touchpoint with a load level below a predetermined threshold.

14. The computer-implemented method of claim 9, wherein the profile data comprises at least one of demographic information of the client or preference information of the client.

15. The computer-implemented method of claim 9, further comprising:
retrieving, by the device, external data associated with a location of the client, wherein the first and second machine learning algorithms take as input the external data.

16. A computer program product for facilitating dynamic tailoring of computing touchpoint journeys, the computer program product comprising a computer readable memory having program instructions embodied therewith, the program instructions executable by a processor to cause the processor to:
obtain profile information and context information of a computing client currently engaged in a computing touchpoint journey, wherein the profile information and the context information characterize at least an objective of the computing client, and wherein the profile information and the context information are respective of a capability of the computing client;
predict, via a first machine learning classifier trained based on previous contexts and profiles associated with previous negative events, a negative event likely to occur on the computing touchpoint journey; and
propose, via a second machine learning classifier trained based on previous computing touchpoints that resolved the previous negative events, a next computing touchpoint for the computing client based on the predicted negative event, the profile information and the context information, including the capability of the computing client.

17. The computer program product of claim 16, wherein the program instructions are further executable to cause the processor to:
document computing touchpoint journeys of other computing clients; and
derive, from the documented computing touchpoint journeys, the previous contexts and profiles, the previous negative events, and the previous computing touchpoints to train in real-time the machine learning classifier based on the documented computing touchpoint journeys.

18. The computer program product of claim 16, wherein the program instructions are further executable to cause the processor to:
drive the computing client to the proposed next computing touchpoint.

19. The computer program product of claim 16, wherein the profile information comprises at least one of demographics of the computing client, computing touchpoint preferences of the computing client, historical information of the computing client, or payment information of the computing client.

20. The computer program product of claim 16, wherein the program instructions are further executable to cause the processor to:
initiate a post issue resolution computing touchpoint journey for the computing client via an email or a survey.

21. The system of claim 1, wherein the decision component recommends the computing touchpoint by:
ranking a set of possible computing touchpoints based on client preferences derived from previous client interactions inputs in the computing context and the computing profile;
determining a likelihood of resolving the predicted negative event for each of the set of possible computing touchpoints; and
determining the recommended computing touchpoint as a highest ranked possible computing touchpoint of the set that has an associated likelihood above a threshold value.

22. The method of claim 9, wherein the dynamically suggesting the computing touchpoint comprises:
ranking a set of possible computing touchpoints based on client preferences derived from previous client inputs included in the profile data and context data;
determining a likelihood of resolving the forecasted unsuccessful event for each of the set of possible computing touchpoints; and
determining the dynamically-suggested computing touchpoint as a highest ranked possible computing touchpoint of the set that has an associated likelihood above a threshold value.

23. The computer program product of claim 16, wherein the proposing the next computing touchpoint comprises:
ranking a set of possible computing touchpoints based on client preferences derived from previous client inputs included in the profile information and the context information;
determining a likelihood of success for each of the set of possible computing touchpoints; and
determining the proposed next computing touchpoint as a highest ranked possible computing touchpoint of the set that has an associated likelihood above a threshold value.

* * * * *